Feb. 27, 1940. R. HOFGAARD 2,191,567
CALCULATING MACHINE
Filed Jan. 4, 1937 8 Sheets-Sheet 1
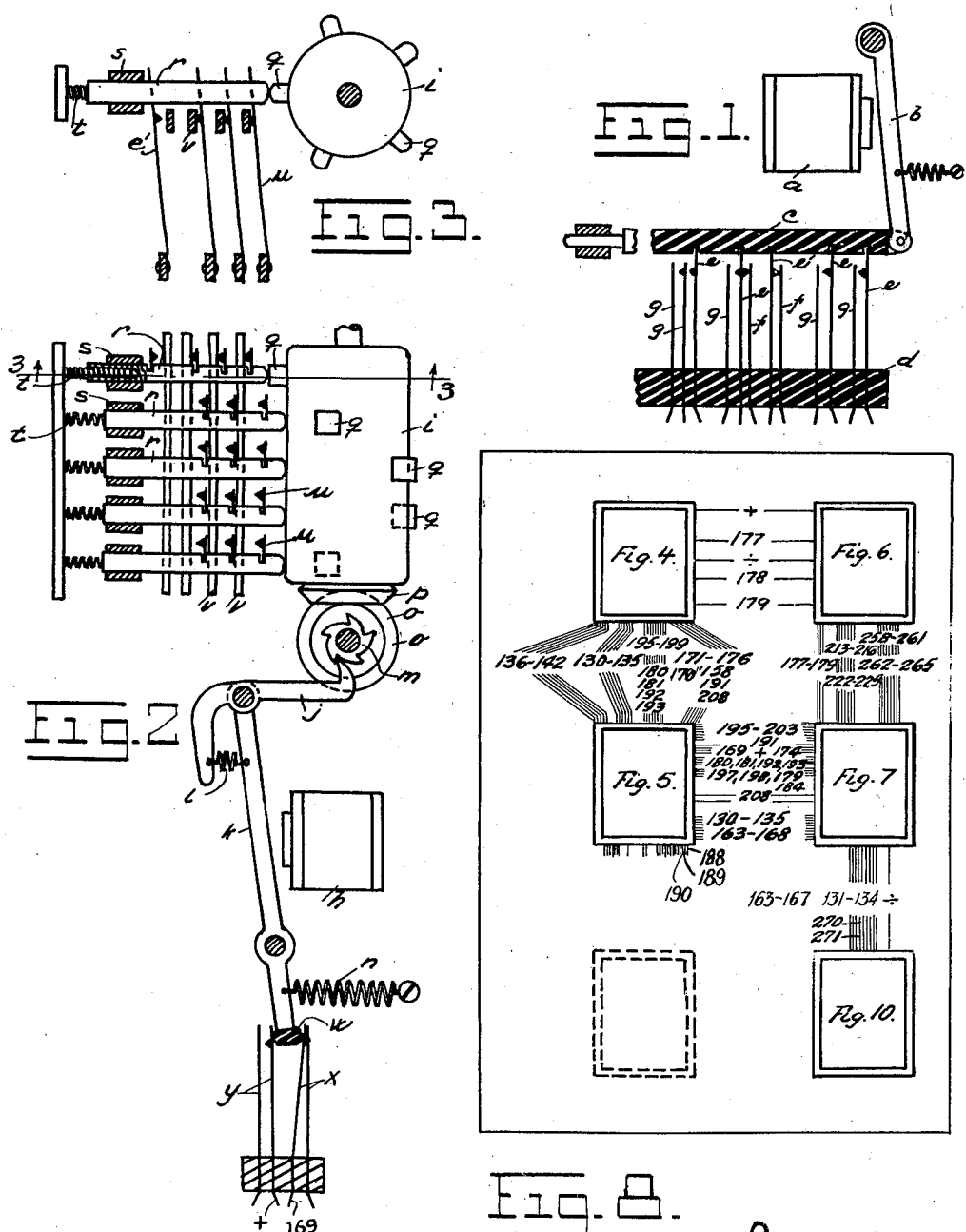

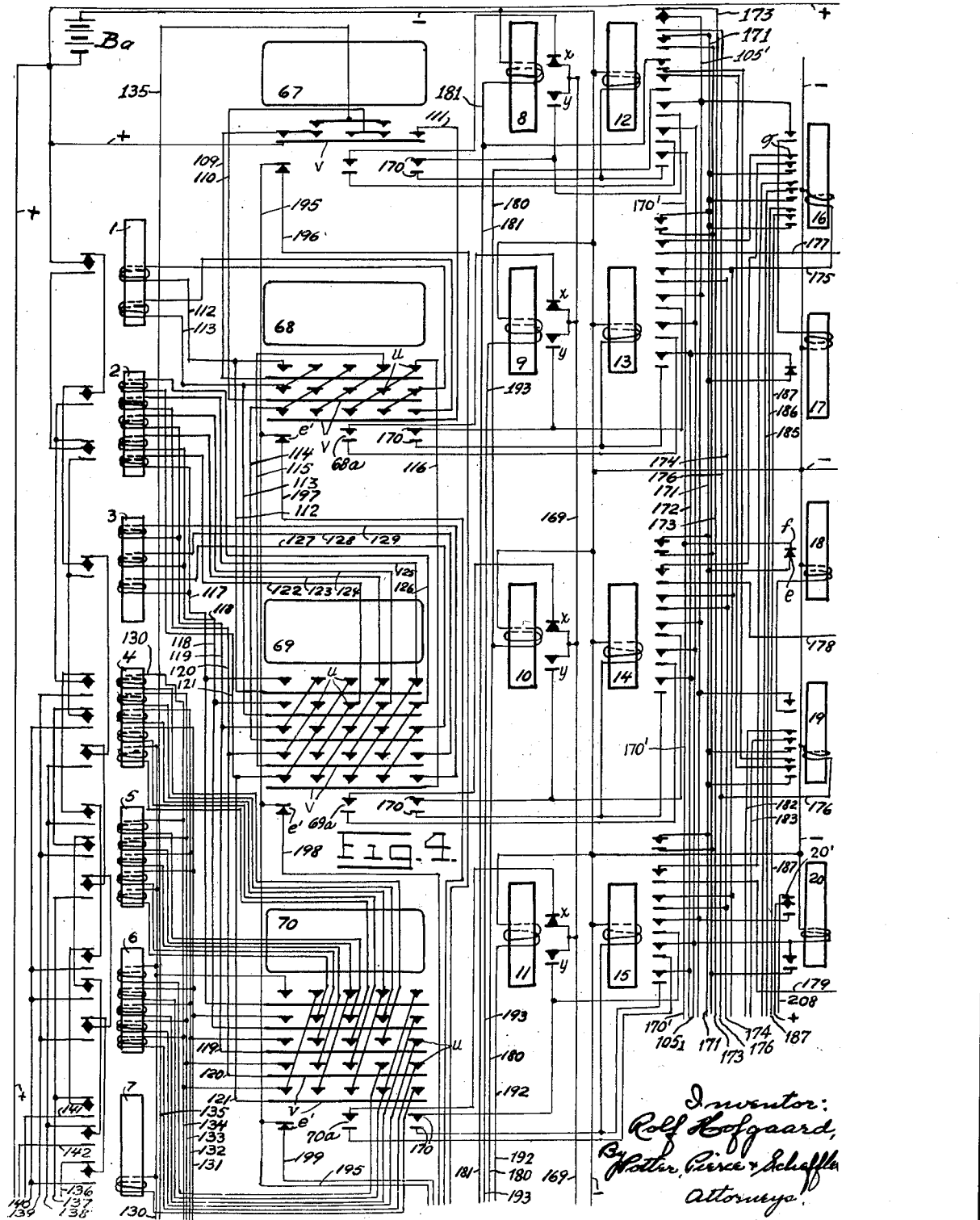

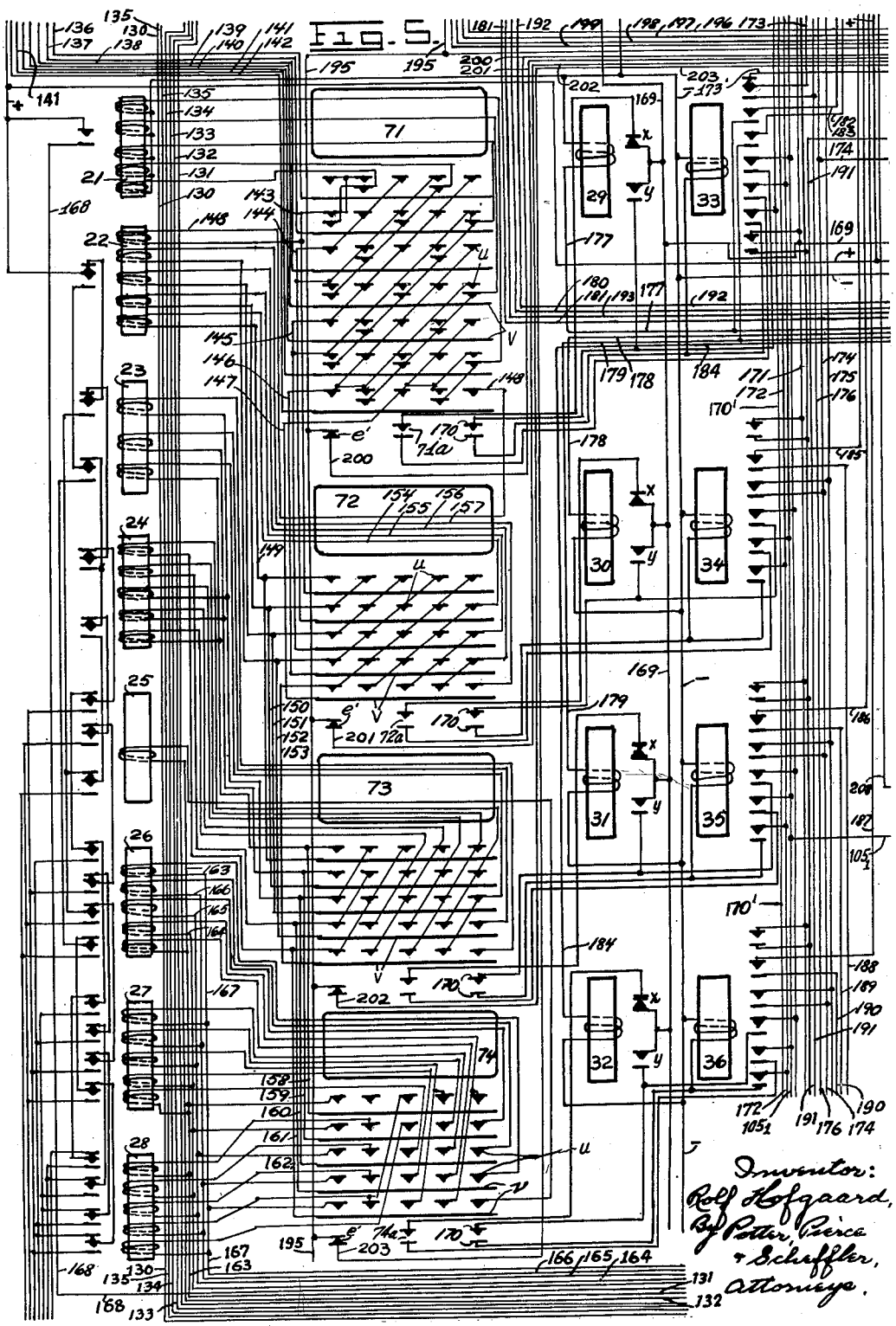

Feb. 27, 1940.　　　R. HOFGAARD　　　2,191,567
CALCULATING MACHINE
Filed Jan. 4, 1937　　　8 Sheets-Sheet 4

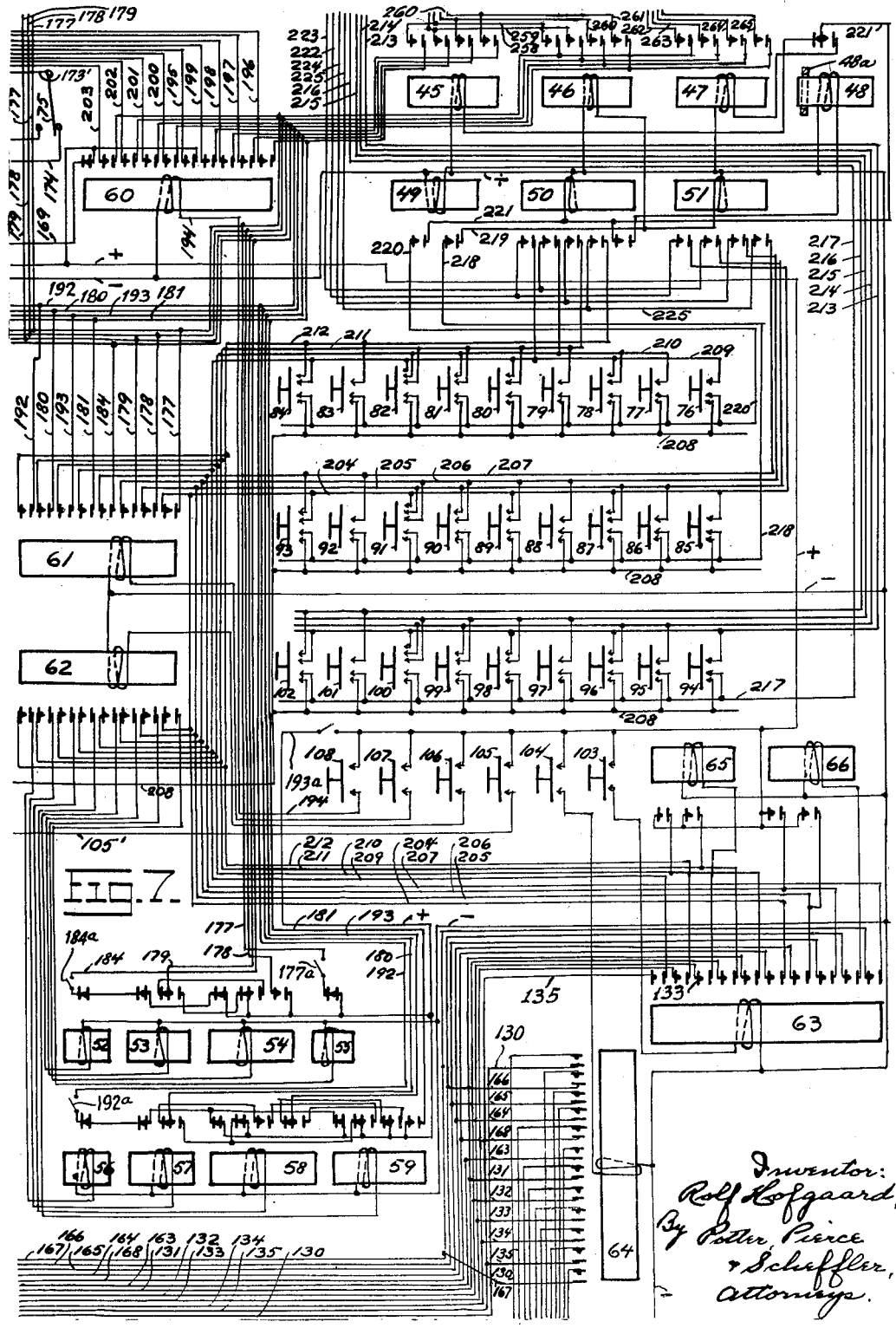

Feb. 27, 1940.                R. HOFGAARD                 2,191,567
                         CALCULATING MACHINE
                         Filed Jan. 4, 1937            8 Sheets-Sheet 6
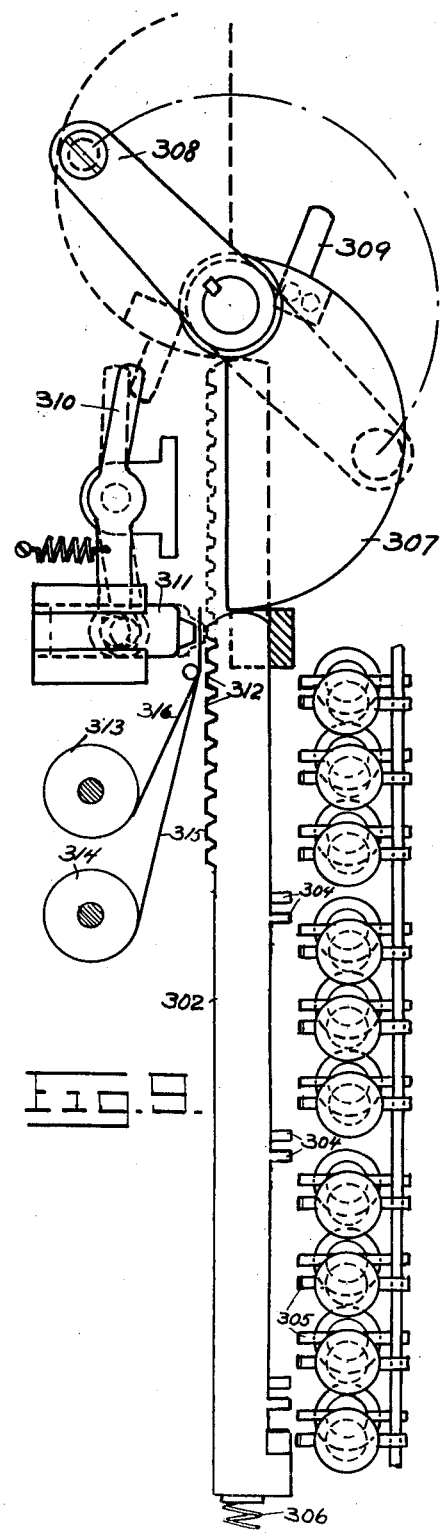
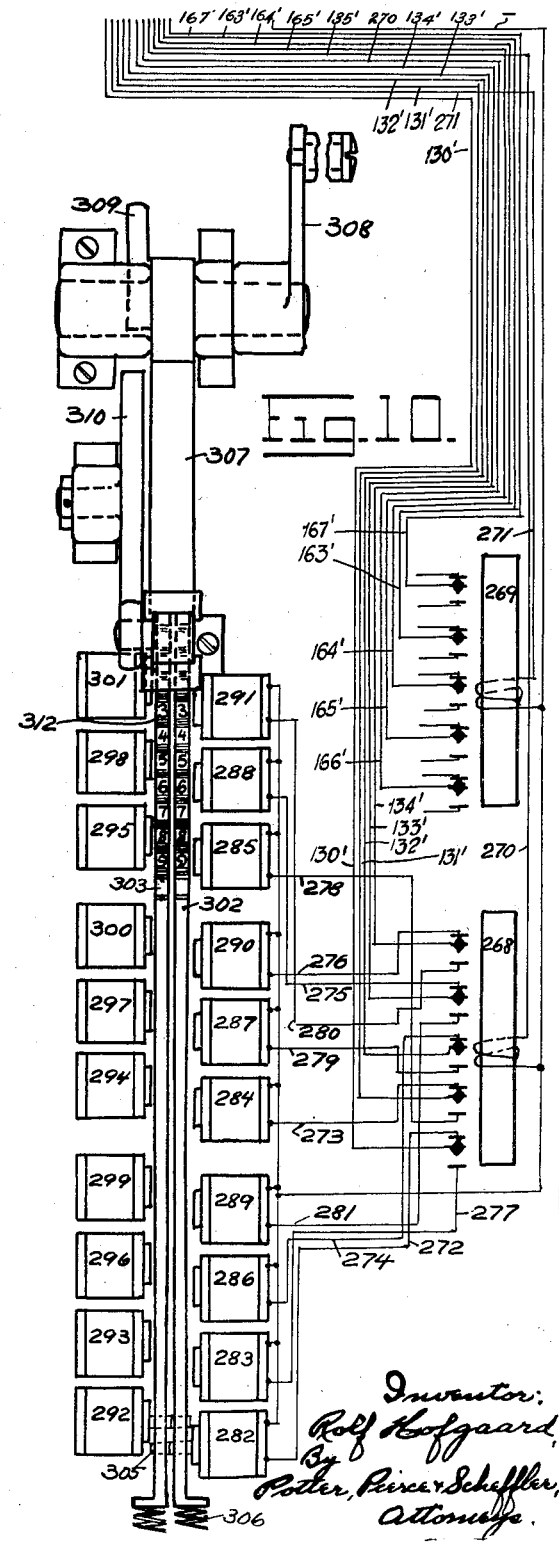

Feb. 27, 1940. R. HOFGAARD 2,191,567
CALCULATING MACHINE
Filed Jan. 4, 1937 8 Sheets-Sheet 7

Inventor:
Rolf Hofgaard,
By Potter, Pierce
& Scheffler,
Attorneys.

Patented Feb. 27, 1940

2,191,567

UNITED STATES PATENT OFFICE 2,191,567

CALCULATING MACHINE

Rolf Hofgaard, Brate Gard, Strommen, Norway

Application January 4, 1937, Serial No. 119,027
In Sweden January 4, 1936

11 Claims. (Cl. 235—61)

The present invention refers to calculating machines operating with electric circuits in conjunction with registering or accumulating members and relays controlling contacts for closing said circuits. Prior machines of this general type operate with digit lines comprising lead groups of ten digit leads or, in other prior machines, the group of leads corresponding to the digit lines of the decimal system occur in a number smaller than 10. These groups of leads, by means of which one-figure numbers of the decimal system are expressed in code form, are connected to registering members for each denominational order. The said registering members have the common feature that a transfer from a lower order to the next higher order takes place when the value registered in the lower order exceeds the capacity of the registering member for the lower order, such as for instance the number 9 in the units order.

The present invention makes use of registering or accumulating members for the registering of a plurality of the basic values of a numerical system. Since each registering member thus accumulates individual basic values, the method of effecting a transfer from one basic value to the next higher value is simplified in that such transfer is delayed until the final result of a calculation operation is wanted. That part of a value registered by the accumulating member of one denominational order, which belongs to one or more higher denominational orders will be determining for the correct result circuits without any prior registering of the said values by the accumulating members corresponding to the respective denominational values involved. According to another characteristic feature of the machine according to the present invention, all values are registered according to the numerical system having the number "2" as the basis in a geometric series. As this system is built up solely of basic values, the mechanical registering of these values, i. e., the operation of the accumulating members, will be effected in the same manner for all values, although by different members. The result which is expressed by ordinary numeral characters need not necessarily appear in figures of the decimal system, since in addition to the latter both the system having the number "2" as its basis or for instance, also systems having the number "12" or the number "20" as a basis may be used.

In connection with the present form of embodiment, however, the result will appear in figures of the decimal system, although it is also illustrated as being transferred to a system using the code 1—2—4—8 and so on. It may also be carried out according to other mathematical systems, such as for instance according to systems having the numbers "12" or "20" as basis, in which systems, however, the various values are expressed by figures belonging to the conventional decimal system.

The advantages obtained by the machine according to the present invention are, in the first place, great simplicity as regards its mechanical details and, secondly, high speed, inasmuch as the various calculations are carried out with the same mechanical operations regardless of the value of the figure concerned, and therefore simultaneous functioning of the operating member is rendered possible, especially as the operating members chiefly consist of electric relays which act almost instantaneously.

The invention relates to a calculating machine of that special type which operates with the aid of impulses of an electrical or mechanical character, or both. These calculating machines substantially have no rotating, oscillating or reciprocating calculating mechanisms, such as the conventional mechanical calculating machines have. They are primarily based on results which are determined or calculated beforehand, and are thus established by electric circuits, and each result concerned in a calculating operation is to be found by closing the proper circuit or circuits by the aid of electrical means, such as selectors or relays. Similar calculating machines are previously known, in which, however, a second number of a calculating operation can be introduced into the machine only through the agency of the first number already introduced into the machine.

Now, the calculating machine according to the present invention is principally distinguished by the feature that it operates directly with a code, without any previous transfer of the code to the decimal system.

As is well known, four basic impulses are sufficient to express the digit numbers of the decimal system since they provide fifteen combinations, in which the four impulses each appear only once. These four basic impulses may preferably represent the numbers 1, 2, 4 and 8, the other numbers being derived from these by computation. The calculating machine according to the present invention is based on the reception of four basic impulses in various combinations to register the numbers 1–9, also the transmission obtained in the same code form of the result. This system of utilizing the code 1, 2, 4, 8 may obviously be increased beyond the number 15 with impulses corresponding to the numbers 16, 32, 64 and so forth, but for practical purposes it is sufficient to use the first four members of the geometric series $2^0, 2^1, 2^2, 2^3, \ldots 2^n$.

In accordance with the statements hereinbefore, the calculating machine according to the present invention thus is provided with adjustable members, such as accumulating members or selectors, directly accumulating the desired result of the calculating operations, said accumulating members occurring in a number corresponding to the least or approximately to the least possible number of digits for compounding all digits of the basic order of a digit system, such as the first nine digits of the decimal system. When here the least or approximately the least number is spoken of, this implies that the present invention is primarily based on the possibility of reducing the number of operating members to the least possible figure, for instance to only four adjustable members in the decimal system, such members representing the four numbers 1, 2, 4, 8 for each denominational order. On the other hand, the invention also comprises such modifications, where approximately the least possible number of adjustable members are brought into use. For example, an approximately least possible number of members may include, in addition to the four members representing 1, 2, 4, 8, a further member representing the number 6 which corresponds to 2+4.

The expression "the least possible number of digits required for compounding all digits of the basis order of a digit system" thus implies that, for instance in the decimal system (that is to say, a system having orders of units, tens, hundreds, etc.), the nine digits 1–9 in each order may be compounded with the aid of the above mentioned four members 1, 2, 4 and 8 only, which are used singly or are compounded in the following manner:— 1, 2, 1+2=3, 4, 4+1=5, 4+2=6, 4+2+1=7, 8, 8+1=9. In all such compounding, each one of the four basic numbers always occurs but once. The possibility is conceivable, however, that for instance for the digit 8 two impulses could be used, each representing the digit 4.

The adjustable or accumulating members pertaining to the calculating machine, which, for the sake of simplicity, in the following are termed selectors, inasmuch as this kind of mechanism is the most suitable for this purpose, are preferably constructed in such a manner that for a complete movement cycle, for instance one revolution of a rotary movement, or a complete reciprocation or oscillation in the case of rectilinear or swinging movement, the members are advanced in a predetermined number of steps, for instance five steps by preference, although they may be made to carry out 10, 20 or still more and any other arbitrary number of steps for each revolution or total rectilinear or swinging movement. The movement of these selectors step by step may be initiated by means known from other technical fields, such as for instance keys, perforated cards, levers and so forth.

Three different forms of embodiment of the invention are illustrated in the accompanying drawings, wherein:

Fig. 1 is a fragmentary side elevation, with parts in section of a contact operating relay;

Fig. 2 is an elevation of a stepwise operating selector;

Fig. 3 is a transverse section thereof on line 3—3 of Fig. 2;

Fig. 4 is a circuit diagram of that part of the apparatus which includes the selectors for recording the numbers 1, 2, 4, 8;

Fig. 5 is a circuit diagram of that part of the apparatus which includes the selectors for recording the numbers 10, 20, 40 and 80;

Fig. 7 is a circuit diagram of the transmitting members and transfer members for addition, subtraction and multiplication;

Fig. 8 is a diagram illustrating the mutual relation between the four circuit diagrams shown in Figs. 4, 5, 6 and 7, and the individual connecting lines between them;

Fig. 9 shows a printing device in elevation;

Fig. 10 shows the same printing device in plan view with the connections for the magnets representing the digits 0–9 in two denominational orders;

Figure 6:
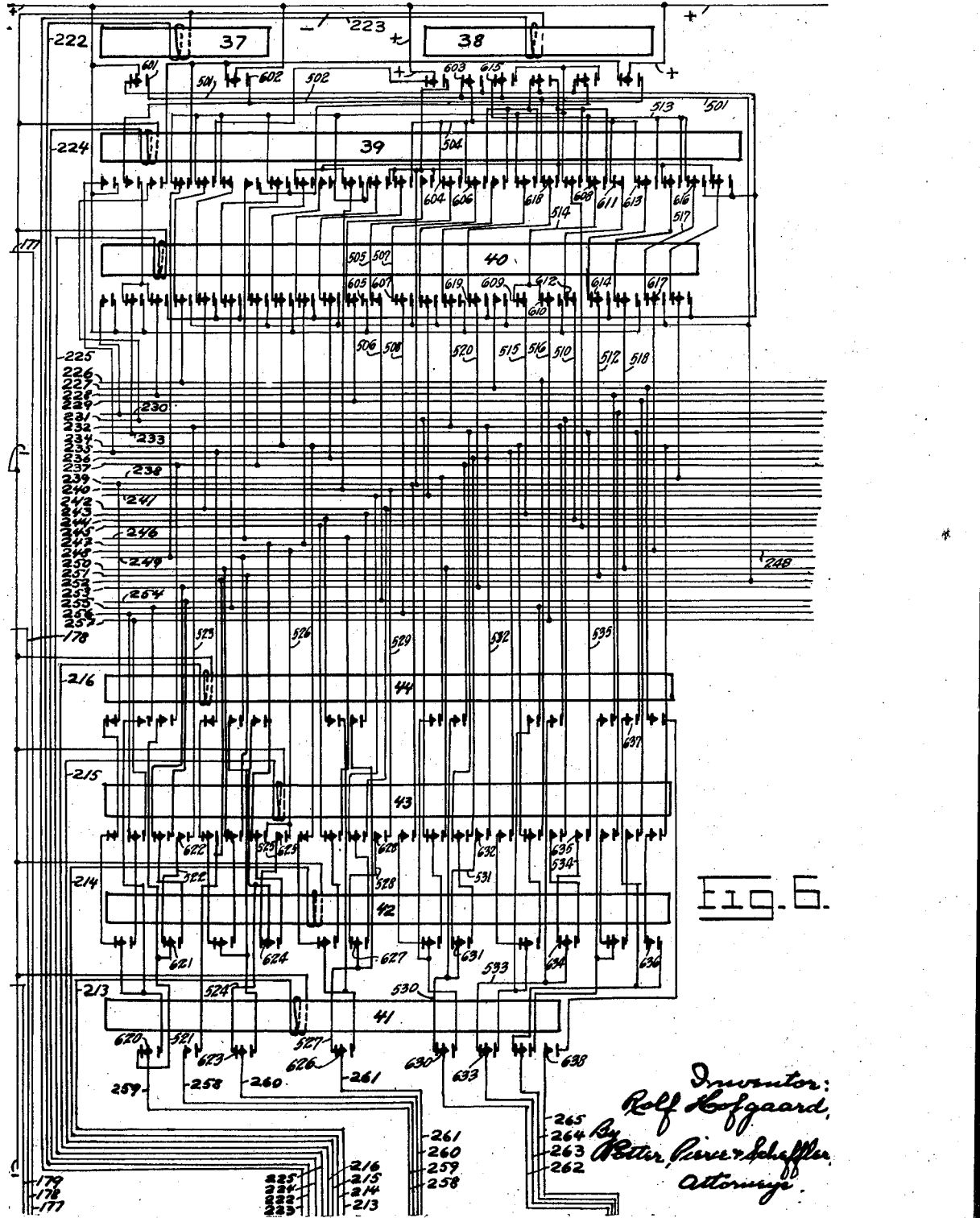
Fig. 6 is a circuit diagram of the relays that are employed for multiplication operations.

Referring to the drawings, the whole machine may be said to consist of the arrangements shown in the four diagrams, Figs. 4, 5, 6 and 7. These diagrams should be joined together in the manner shown in Fig. 8. The latter figure also shows that the machine may be extended, if a greater capacity is desired, by adding further units to Figs. 5 and 6, respectively. In these various diagrams, substantially three kinds of operating mechanisms are utilized. These are the following:

(A) Relays or magnets having armatures which operate contacts of the usual kind, that is to say making contacts, breaking contacts and change over contacts. Such a relay arrangement is shown in Fig. 1.

(B) Accumulators or selectors adapted to have various positions in relation to an initial position, each accumulator representing a certain numerical value and the various positions representing multiples of such numerical values. A preferable form of such selector is shown in detail in Figs. 2 and 3.

(C) Electric leads including contacts, which are operated either by the relays mentioned under (A) or by the selectors mentioned under (B) and further including manually operable control buttons such as 76–108, Fig. 7, or switches.

The relays, which operate in the manner indicated in Fig. 1 and explained below, are the following in the four diagrams mentioned above: 1–7 on the left-hand side of Fig. 4; 12–15 and 16–20 on the right-hand side of Fig. 4; 21–28 on the left-hand side of Fig. 5; 33–36 on the right-hand side of Fig. 5; 37–44 in Fig. 6, 45–51 at the top of Fig. 7; 52–59 in the lower left-hand corner of Fig. 7; 60 in the upper left-hand corner of Fig. 7; 61 and 62 in the middle of Fig. 7 to the left, and 63–66 in the lower right-hand corner of Fig. 7; 268 and 269 at the right-hand side of Fig. 10; 326, 339 and 346 on the left-hand side of Fig. 11 and 376 at the bottom of Fig. 11; finally, 423–427 at the bottom of Fig. 12; 438 at the upper left-hand corner of Fig. 12, and 444 in the middle of Fig. 12.

The accumulating devices, which in the following are called selectors, are shown in Fig. 2, where they have been denominated $i$, and these selectors which have the form of rollers are rotated stepwise by means of a mechanism which in turn is operated by the selector actuating magnet or relay $h$. The details of this mechanism are shown in Figs. 2 and 3. In the diagrams, the selectors and the pertaining driving magnets are the following: in Fig. 4, selector 67, driving magnet 8; selector 68, driving magnet 9; selector 69, driving magnet 10; selector 70, driving magnet 11; in Fig. 5, selector 71, driving magnet 29; selector 72, driving magnet 30; selector 73, driving magnet 31; selector 74, driving magnet 32; in Fig. 11, selector 317, driving magnet 321; selector 318, driving magnet 322; selector 319, driving magnet 323; selector 320, driving magnet 324; in Fig. 12, selector 390, driving magnet 394; selector 391, driving magnet 395; selector 392, driving magnet 396; selector 393, driving magnet 397.

Figure 11:
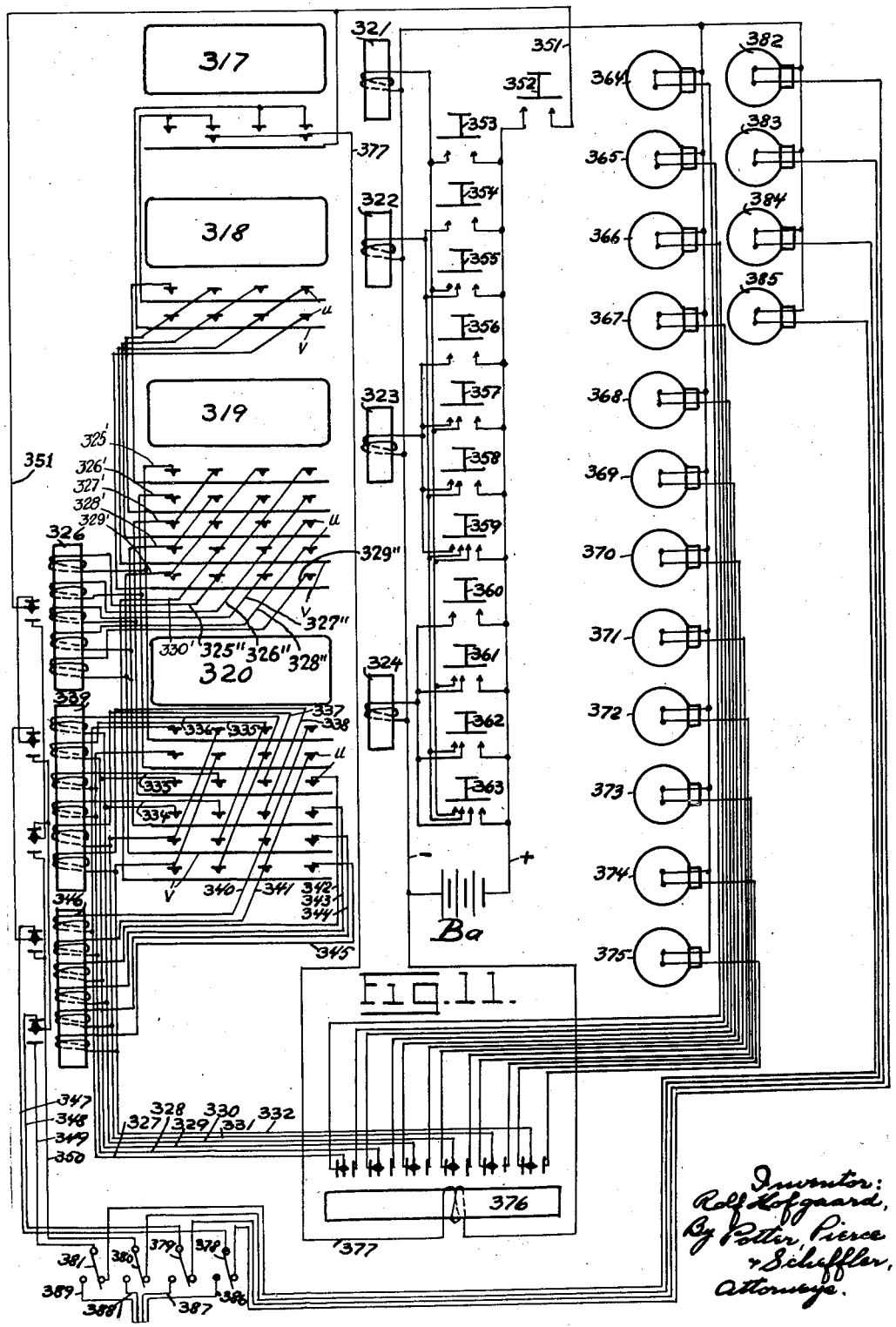
Fig. 11 shows a modified circuit diagram of apparatus employing a numerical system with the number "12" as basis.
Figure 12:
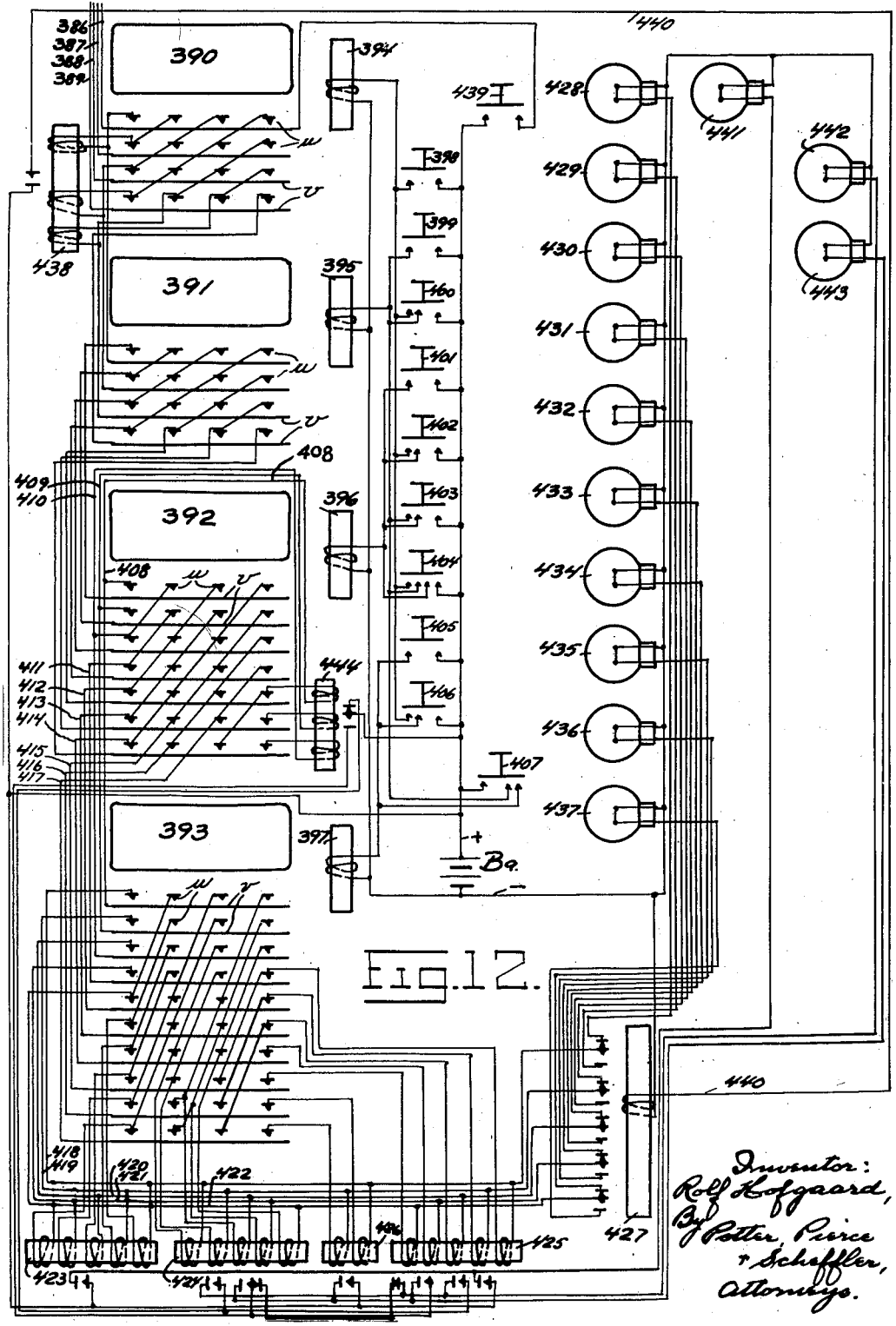
Fig. 12 shows a further modified circuit diagram of apparatus employing a numerical system with the number "20" as basis.

The relays, magnets and selectors are interconnected by circuits, and the source of current is derived from a battery Ba, shown in the upper left-hand corner of Fig. 4, in the middle of the lower part of Fig. 11 and at approximately the same place in Fig. 12. These circuits are closed by switches or by pressing down buttons or keys and opened by releasing said buttons or by opening said switches. The operating buttons or keys in Fig. 7 are the following: 76-84 corresponding to the digit numbers 1-9, both inclusive; the buttons 85-93 corresponding to the numbers 10-90, both inclusive; the buttons 94-102 corresponding to one-figure multipliers 1-9, both inclusive. The button 107 is utilized when figures are added, the button 106 is utilized when one figure is subtracted from another figure, and the button 108 is utilized when the selectors are to be returned to their initial position upon a calculating operation having been carried out. The button 103 is utilized when it is desired to obtain the result in code form, for instance, for transmitting the same to perforated cards or the like. The button 104 is utilized when the result is to be expressed in the decimal system by means of the device shown in Figs. 9 and 10. The buttons or keys 94-102 may be extended by further rows of similar buttons to express two-digits or more-digits multipliers. Such further rows of buttons have not been shown, however, as they are identical with those illustrated. It is of course to be understood that such additional buttons will cooperate with relays of the same kind as the relays 41-44, Fig. 6. No special button or key is required for initiating a multiplication operation. By setting up the multiplier by means of any of the buttons 94-102 the buttons 76-99 are automatically prepared for setting up the multiplicand or multiplicands thereon.

There are further switches shown in the leads 177, 184, 192 near the relays 55, 52 and 56 in the left-hand corner of Fig. 7 and in the lead near the button 108. These switches are generally opened and may be mechanically connected with the button 106, so that they are closed when pressing down button 106. There is further a change-over switch 75 at the upper left-hand corner of Fig. 7, the function of which will be explained later on.

In Fig. 11, the buttons 353-363 correspond to the digits 1-11 in the duodecimal system, and the button 352 is utilized for closing the circuit including the lead 351. In Fig. 12, which in the general outlay is similar to the diagram shown in Fig. 11, the buttons 398-406 represent the figures 1-9 in the numerical system having the number "20" as basis. The buttons 407 and 439 are utilized for closing circuits and will be described later on.

In Figs. 11 and 12 there are shown signalling lamps 364-375, 382-385, 428-437 and 441-443. These signalling lamps may be utilized for indicating visibly the result obtained by the calculating operation.

Further, electric magnets are used in the mechanism shown in Figs. 9 and 10, where they serve as stop members for the indicating bars 302 and 303.

Further details will come forth in the following description.

A typical relay unit, as shown in Fig. 1, includes a magnet $a$ having a spring-retracted armature $b$ for actuating a plate $c$ of insulating material that is notched to receive the movable ends of a series of contact springs $e$ and $e'$ which are secured at their other ends, in the insulating plate $d$. Energization of the magnet and the resultant attraction of the armature moves the plate $c$ in such manner that the springs $e$ and $e'$ introduced into the plate $c$ leave their back or resting contacts $f$ so as to be pressed against their working contacts $g$. The plate $c$ as well as the carrying plate $d$ are shown as broken away since a varying number of springs are employed in the different relays.

*Selectors*

Fig. 2 shows a step selector viewed from above. The magnet $h$, which is termed the selector actuating relay in the following, moves, for each circuit closure over the coil thereof, the roller $i$ by one step forward with the aid of the pawl $j$ which is pivoted to the armature $k$. The spring $l$ causes the pawl to engage the ratchet wheel $m$. The spring $n$ causes stepwise feeding of the roller when the circuit over the coil for the magnet $h$ is opened, whereby the spring $n$ retracts the armature. The movement of the ratchet wheel $m$ is transmitted to the roller by the gear wheels $o$ and $p$. The roller $i$ carries projections $q$, by means of which the contact rods $r$ inserted into the bearing sleeves $s$ and pressed against the roller by the coil springs $t$ are moved. The contact rods of insulating material are provided with notches for the contact springs $u$ which cooperate with the fixed contact bars $v$. Movement of each rod $r$ by the roller displaces the associated contact springs $u$ towards the left, Figs. 2 and 3, and thereby alters the contact condition at each spring. The set of springs which is shown in Fig. 3 includes three contact springs $u$ displaced into contacting position with their respective contact bars $v$ and a fourth resting or back contact displaced into open position. This group of springs will hereinafter be termed the first set of contacts of the roller. The contact springs corresponding to the following four bars are designated the second, third, fourth and fifth set of contacts respectively. The number of contacts and the mode of closing them may be varied arbitrarily. The springs as well as the contact bars $v$ will also be counted in numerical order from the roller.

In connection with the armature $k$, the arm $w$ has secured thereon an insulating button adapted to actuate the two spring sets $x$, $y$. When the armature is attracted, the contact is opened between the springs $x$, while the set of contacts $y$ are closed.

All relays are represented as rectangles, and the conductor or conductors by which the coil is wound are represented as spirals about the relays. The various sets of contact springs actuated at a movement of the armature of the coil are shown as being parallel to one of the sides of the rectangles, where the contact points proper will be seen. To make the figures of the drawings more clear, the armature proper and the mechanical transmission means for the transmission of the movement thereof to the springs, as described with reference to Fig. 1, are not illustrated. All relay contacts are shown in the position which they assume when the circuit or circuits extending over the coil are not closed with the two terminals of the battery. The contact points of the movable springs then rest on their resting contacts, provided such are included, which resting contacts, as far as the relays 1-36 and the relays 268 and 269, Fig. 10 are concerned, bear on the contact point of the movable contact springs on the right hand side of the spring, whereas in the relays 37-66 they bear on their respective resting contacts at the contact point on the left hand side of the spring. The movement of the springs is toward the working contacts, which, if there is any, are arranged on the set of springs on the opposite side of the spring relatively to the resting contact. If there is no resting contact, a circuit will consequently be closed over the movable contact spring, when a circuit over the coil corresponding to the spring is closed. Figs. 4, 5, 11 and 12 show a series of step selectors of the type shown in Figs. 2 and 3 by way of diagrammatic representation, the mechanical transmission means to transmit the movement of the armature to the various sets of contacts being here also omitted to render the diagram more surveyable. The contact points of the springs are shown relatively to the roller which is represented as a rectangle. Thus, the frames 67-70 in Fig. 4, the frames 71-74 in Fig. 5, the frames 317-320 in Fig. 11 and the frames 390-393 in Fig. 12, designate the roller $i$ such as shown in Fig. 2. The sets of contacts illustrated in the same figure are represented diagrammatically in Figs. 4, 5, 11 and 12 relatively to the frames. All contacts are shown in inoperative position, which is the case also with those that are moved with the aid of the first contact rod $r$ (the uppermost rod $r$ in Fig. 2) which is shown in Fig. 2 in operative position. The relays corresponding to the magnet $h$ and provided for the movement of the rollers 67-74 are represented in the form of rectangles 8-11 corresponding to the frames 67-70 and as rectangles 29-32 corresponding to the frames 71-74. In the sets of contacts operated by the rollers 67 and 71, some sets of contacts are shown where two contact springs are adapted simultaneously to make contact with the contact bar corresponding to the set of contacts. The contact bars $v$ pertaining to the roller occur in different numbers for the various rollers. Thus there is one contact bar $v$ for the contacts pertaining to the roller 67. To the step selector 68 belong three contact bars $v$, while the step selector 69 and the step selector 70 have five contact bars $v$ each. The step selector 71, Fig. 5, has seven contact bars, while each of the step selectors 72, 73 and 74 is provided with five bars $v$.

In the calculating machine in consideration, the step selectors are used as accumulating members. Each particular connection of the contact points and the bars of the selectors represents a value accumulated. In the form of construction shown by way of example, these values which are determined solely by the mutual position of the selectors, will be expressed directly by a simple manipulation, whenever this may be desired. The bar $v$ pertaining to the selector 67 is connected directly to the plus terminal of the battery Ba, Fig. 4. Of the contacts cooperating with this bar, the contacts in the 1st and 2nd sets of contacts counted from the left in Fig. 4 are connected with each other and with the lead 109 which is connected to the first bar (that is to say the bar nearest to the roller) of the step selector 68. The contacts in the 3rd and 4th sets of contacts of the selector 67 are connected with each other and with the second bar of the selector 68 by means of the lead 110. Finally, the contact in the 5th set of contacts is connected to the third bar of the selector 68 by means of the lead 111. The 1st contact in the 1st set of contacts of the selector 68 is connected with the first bar of the selector 69 through the lead 112. The 1st contact of the 2nd set of contacts is connected to the 2nd contact of the 1st set of contacts and through the lead 113 with the second contact bar of the selector 69. The 1st contact of the 3rd set of contacts is connected with the 2nd contact of the 2nd set of contacts and with the 3rd contact of the 1st set of contacts and by means of the lead 114 with the third contact bar of the selector 69. The 1st contact of the 4th set of contacts is connected to the 2nd contact of the 3rd set of contacts and with the 3rd contact in the 2nd set of contacts and through the lead 115 to the fourth bar of the selector 69. The 1st contact of the 5th set of contacts is connected to the 2nd contact of the 4th set of contacts and the 3rd contact of the 3rd set of contacts and through the lead 116 with the fifth contact bar of the selector 69. The second contact of the 5th set and the 3rd contact of the 4th set are connected with each other and with the lead 112 over a coil of the relay 1. The 3rd contact of the 5th set is connected with the lead 113 over a second coil of the relay 1. In the selector 69, the 1st, 2nd, 3rd, 4th and 5th contacts of the 1st left hand set of contacts are connected through the leads 117-121 to the first, second, third, fourth and fifth contact bars, respectively, of the selector 70. Of the 2nd set of contacts for the selector 69 the 1st and the 2nd contacts are also connected to the leads 119 and 120 respectively. Likewise, the 1st contact of the 3rd set of contacts as well as the 3rd contact of the 2nd set of contacts are connected to the lead 121. The leads 122-126 extend, respectively, from the 2nd contact of the 3rd set of contacts connected to the 4th contact of the 2nd set of contacts, from the 1st contact of the 4th set of contacts connected to the 3rd contact of the 3rd set of contacts and to the 5th contact of the 2nd set of contacts, from the 2nd contact of the 4th set of contacts connected to the 4th contact of the 3rd set of contacts, from the 1st contact of the 5th set of contacts connected to the 3rd contact of the 4th set of contacts and to the 5th contact of the 3rd set of contacts, and from the 2nd contact of the 5th set of contacts connected to the 4th contact of the 4th set of contacts. These leads 122-126 are each connected over a coil of the relay 2 to the leads 117-121. The lead 127 from the 3rd contact of the 5th set of contacts connected to the 5th contact of the 4th set of contacts extends, together with the leads 128 and 129 from the 4th and 5th contacts of the 5th set of contacts for the selector 69 over a coil of the relay 3 to the leads 117, 118 and 119, which are connected, together with the leads 120 and 121, as stated, each to a contact bar of the selector 70.

The contact points of the selector 70 are connected to the leads 130-134 in a manner such that the contacts of the 1st set of contacts and the 1st contact of the 2nd set of contacts which is connected with the 5th contact of the 1st set, are each connected to one of these leads directly. Furthermore, the 2nd, 3rd, 4th, and 5th contacts of the 2nd set of contacts and the 1st contact (which is connected to the previously mentioned 5th contact) and the 2nd contact of the 3rd set of contacts are connected to said leads over coils of the relay 5. The 3rd, 4th and 5th contacts of the 3rd set of contacts, the 1st contact of the 4th set of contacts, in connection with said 5th contact of the 3rd set, and the 2nd and 3rd contacts of the 4th set of contacts are also connected in the same order to the leads 130-134 over coils of the relay 4. The 4th and the 5th contacts of the 4th set of contacts, the 1st contact of the 5th set of contacts, which is connected to said 5th contact of the 4th set, and the 2nd, 3rd and 4th contacts of the 5th set of contacts are connected in the same order with the leads 130-134 over coils of the relay 6. The 5th contact of the 5th set of contacts is connected to the lead 130 over the coil of the relay 7. The set of leads 130-134 are extended, together with the lead 135 which is connected to additional springs of the 2nd and 4th sets of contacts for the selector 67, out of Fig. 4 as result leads corresponding to a registered value determined by the mutual position of the rollers 67-70. The leads are connected to a printing device as shown in Figs 9 and 10, which will be described hereinafter.

To render the Figures 4-7 which represent circuit diagrams of parts of the complete system readily understandable in their relation to each other, said figures are arranged in such a manner that the connecting leads may be followed by placing the figures relatively to each other as shown in Fig 8. Thus the said leads 130-134 are extended over Fig. 5 to contacts of the relays 63 and 64, Fig. 7. Since the circuits that must be closed over these leads are determined by the position of the rollers, the latter will cause a circuit to be closed from the plus terminal of the battery over the respective working or resting contacts of the relays 1-7, in a manner such as will appear from Fig. 4, to one of the leads 136-142. These leads which are extended from Fig. 4 will again be found in Fig. 5, where they appear as being connected to the bars of the selector 71, from the 1st to the 7th contact bars, respectively. The leads 143-147, which are connected with the contact bars of the selector 72, are directly connected with the following contact points of the selector 71. Lead 143 is connected to the 1st and the 2nd contacts of the 1st set of contacts and to the 1st contact of the 2nd set of contacts. Lead 144 is connected to the 3rd and the 4th contacts of the 1st set of contacts, the 2nd and the 3rd contacts of the 2nd set of contacts, the 1st and 2nd contacts of the 3rd set of contacts, and to the 1st contact of the 4th set of contacts. Lead 145 is connected to the 5th and 6th and to the 4th and 5th and to the 3rd and 4th and to the 2nd and 3rd and to the 1st and 2nd contacts of the 1st to 5th contact sets respectively. Lead 146 is connected to the 7th contact of the 1st and 2nd sets, the 6th contact of the 2nd and 3rd sets, the 5th contact of the 3rd and 4th sets, the 4th contact of the 4th and 5th sets and 3rd contact of the 5th set. Lead 147 is connected to the 7th contact of the 3rd and 4th sets, the 6th contact of the 4th and 5th sets and the 5th contact of the 5th set. Lead 148 connected to the 7th contact of the 5th set is extended over the coil 22 to the lead 143 connected to the 1st contact bar of the selector 72. The leads 149-153 are connected, respectively, to the 1st to 5th contact bars for the selector 73 from the 1st to the 5th contacts of the 1st set of contacts for the selector 72. Moreover, the 1st contact of the 2nd set of contacts of the selector 72 is connected to the 2nd contact of the 1st set of contacts. The 1st and 2nd contacts of the 3rd and 2nd sets of contacts are connected with the 3rd contact of the 1st set of contacts. The 1st, 2nd and 3rd contacts of the 4th, 3rd and 2nd sets of contacts are connected with the 5th contact of the 1st set of contacts. The 1st, 2nd, 3rd and 4th contacts of the 5th, 4th, 3rd and 2nd sets of contacts are connected within the 5th contact of the 1st set of contacts. Moreover, the 2nd, 3rd, 4th and 5th contacts of the 5th, 4th, 3rd and 2nd sets of contacts are connected with the lead 154. The 3rd, 4th and 5th contacts of the 5th, 4th and 3rd sets of contacts are connected with the lead 155. The 4th and 5th contacts of the 5th and 4th sets of contacts are connected to the lead 156, and the 5th contact of the 5th set of contacts is connected to the lead 157. Leads 154-157 are connected to the leads 149-152 in numerical order over coils of the relay 22. Leads 158-162 are connected to the 1st to 5th contact bars respectively of the selector 74. Besides, the contact points of the selector 73 are connected in an analogous manner to the contact points of the selector 69. These are extended to the leads 117-121, partly as coils of the relays 2 and 3, and in the same manner the contact points of the selector 73 are connected with the leads 158-162, partly over coils of the relays 23 and 24 corresponding to the relays 2 and 3. The contact points of the selector 74 are connected in a manner analogous to that described with reference to the selector 70, in that the leads 163-167 are extended, together with the leads 130-134, as result leads out of Fig. 5. These leads 163-167 are, in a manner similar to that described with reference to the selector 70, connected to the contact points of the selector 74, partly over coils of the relays 25-28 corresponding to the relays 7, 6, 4 and 5. Corresponding to the lead 135, the lead 168 is also extended out of Fig. 5 in the same set of leads which in Fig. 7 is extended to the contacts of the relays 63 and 64. The lead 168 is connected to the plus terminal by the battery of means of the working contact of the relay 21. This relay comprises 5 different coils, all of which are connected to the minus terminal of the battery and to 1st and 2nd additional contacts of the 2nd and 1st sets of contacts, to 1st, 2nd, 3rd and 4th additional contacts of the 4th, 3rd, 2nd and 1st sets of contacts, to 2nd, 3rd, 4th, 5th and 6th additional contacts of the 5th to 1st sets of contacts, to 4th, 5th, 6th and 7th additional contacts of the 5th to 2nd sets of contacts, and to 6th and 7th additional contacts of the 5th and 4th sets of contacts.

The selector actuating relays 8-11, Fig. 4, and the relays 29-32, Fig. 5, the functions of which are analogous to those of relay h in Fig. 2, perform, in addition to a movement of the appertaining rollers, also a contact closure of the working contacts y. The movable contact springs of these sets of contacts are all connected to the + terminal of the battery by means of the lead 169 over a resting contact of the relay 60 in Fig. 7. Over the working contacts in the set of contacts 170 pertaining to the 5th set of contacts of all selectors 67–74, a circuit is closed to the relays 12–15, Fig. 4, and 33–36, Fig. 5, when the relays 8–11 and 29–32 keep the working contacts y closed and the appertaining selector rollers occupy the 5th step position. The same circuits which are thus closed from the plus terminal of the battery over a resting contact of the relay 60, the lead 169, the working contacts y, lead 170' and the coils of the relays 12–15 and 33–36 are also connected to working contacts of these relays. The movable contact spring of the relays 12 and 33 corresponding to these working contacts is connected to the lead 170' which, in turn, is connected over a resting contact of the relay 18, Fig. 4, to the lead 171 which is connected over a working contact of the relay 20, Fig. 4, to the plus terminal of the battery. The circuits which are closed over the coils 13, 14, 15 and 34, 35 and 36 are also extended over working contacts of the respective relays to the lead 172 which is connected over a resting contact of the relay 17 to the above mentioned lead 171. The circuits of the relays 12–15 and 33–36 will therefore be closed later on by means of the circuit +, lead 171, lead 170', and lead 172.

The lead 171 is connected over a resting contact of the relay 12 to the lead 173 which is connected to the uppermost contact spring of the relay 33, Fig. 5, and over a resting contact of the contact switch 75, Fig. 7, to the lead 174, to working contacts of the relays 13–15 and 34–36 and to the lead 175 over the coil of the relay 16, Fig. 4, to the minus terminal of the battery. The leads 171 and 173 are moreover connected to the lead 176 over working contacts of the relays 12 and 33, which are connected to minus over the coil on the relay 19, Fig. 4.

Over working contacts of the relay 16, the lead 171 is connected to the leads 177, 178 and 179 over working contacts of the relays 13, 14 and 15, see Figs. 4, 6, 7, and 5. The leads 177–179 are connected to the minus terminal of the battery over the coils of the selector actuating relays 29, 30 and 31. Over working contacts of the relay 19, the lead 171 is connected to the lead 180 and the lead 181 over working contacts of the relay 12. The leads 181 and 180 are connected to the minus terminal of the battery over the coils of the selector actuating relays 8 and 10. Moreover, the leads 182 and 183 are connected to the lead 171 over working contacts of the same relay 19. These leads 182, 183 are connected over working contacts of the relay 33 to the leads 177 and 179 which extend onto the minus terminal of the battery over the coils of the relays 29 and 31. By reason of the circuits described, the plus terminal will be seen to be connected to the lead 171 over a working contact of the relay 20. Furthermore, the leads 185, 186 and 187 are connected over working contacts of the relay 16 to the lead 171, which is connected over working contacts of the relays 34, 35 and 36 to the leads 188–190. These leads are extended out of Fig. 5 and permit of being connected to a further set of step selectors connected in a manner analogous to that of Fig. 5, if the capacity of the machine is desired to be made greater.

In such a case, the switch 75, Fig. 7, is switched over, so that lead 173 is connected to lead 191 which in its turn will be connected to the uppermost contact of a relay corresponding to relay 33 in the next following set of step selectors below those of Fig. 5. The lead 105', therefore, is connected with lead 174 over a series of resting contacts of relays, one in each set of selectors. The lead 105' may be connected to the plus terminal of the battery by means of the push button 105, Fig. 7, or it may be connected automatically to the said plus terminal over lead 165, the X-contacts of the relays 8–11 and 29–32, and an extra working contact 67a–74a on the third step of the selectors 67–74 and further a working contact of the respective relays 12–15 and 33–36 pertaining to said selectors.

The relays 8–11 and 29–32 for moving the rollers of the selectors may also be closed by means of the push button 108, Fig. 7, in that the plus terminal is connected by this push button to the lead 194 which is connected with the minus terminal of the battery over the coil of the relay 60. The circuit over the resting contact of this relay from the plus terminal of the battery to the lead 169 connected to the contacts x, y of the step selector relays will thus be opened. On the other hand, the plus terminal is closed over a working contact of this relay 60 to the lead 195, Fig. 5, which is connected over resting contacts of the first set of contacts of the selectors 67–70 and 71–74 to the leads 196–203. Over other working contacts of the relay 60, the leads 196–203 will be closed to the leads 181, 193, 180, 192 and 177, 178, 179, and 184. The latter leads are connected to the minus terminal of the battery over the coils of the following relays stated in the same order: 8, 9, 10, 11 and 29, 30, 31, and 32. The circuit over the said relays may be closed and opened by means of the push button 108, whereby the circuit over the relay 60 is closed and opened and the selector are rotated step by step. As soon as the selectors reach their initial position, the resting contacts connected to the leads 196–203 will be opened, whereby the said circuits to the selector relays are opened, and the selectors remain stationary in their initial positions.

By means of the push button 107, Fig. 7, a circuit is closed from the plus terminal of the battery over this push button and the coil of the relay 61 to the minus terminal of the battery. The leads 177, 178, 179 and 184 are then closed over working contacts of this relay 61 with the leads 204–207 respectively. Since the plus terminal is closed over a resting contact 20' of the relay 20, Fig. 4, with the lead 208, circuits may be closed by means of the push buttons 85–93 corresponding to the values 10–90, over the leads 204–207 and over working contacts of the relay 61 to the leads 177, 178, 179 and 184 and to the minus terminal of the battery over the coil for the selector actuating relays 29–32. Push button 85 thus connects the lead 208 to 204, push button 86 connects the lead 208 to the lead 205, push button 87 connects the lead 208 to 204 and 205, push button 88 connects the lead 208 to the lead 206, push button 89 connects the lead 208 to leads 204 and 206, push button 90 connects the lead 208 to leads 205 and 206, push button 91 connects lead 208 to leads 204, 205 and 206, push button 92 connects lead 208 to lead 207, and push button 93 connects lead 208 to leads 204 and 207. Lead 208 is connected to leads 209–212 over push buttons 76–84. These leads are connected over working contacts of relay 61 with leads 181, 183, 180 and 192 which are connected with the minus terminal of the battery over the coils of the selector actuating relays 8–11. By means of the said push buttons it will thus be possible to close circuits over the coils of the selector actuating relays as long as the circuit over the relay 61 is kept closed. By means of the push button 106 a circuit is closed directly over the relay 62, by which leads 204–207 and 209–212 are closed directly to the relays 55, 54, 53, 52 and the relays 59, 58, 57 and 56. According as one or more of these circuits are kept closed by means of the push buttons 76–93, the plus terminal of the battery will be closed over working or resting contacts on these relays and switch to the leads for the selector actuating relays. The circuits thus closed correspond, as will be immediately seen from Fig. 7, to the complementary values corresponding to the push buttons 76–93. The push buttons 76–84 correspond to the digits 1–9 of the first order, i. e. units, and the push buttons 85–93 correspond to the same digits of the second order, i.e., tens. The circuits which were thus closed by means of the push button 76 over working contacts of the relay 61 to the relays of the selectors are also closed over a working contact of the relay 62 to the relay 59. When the circuit over the coil on the relay 59 is closed, the plus terminal could be switched over the contact system of the relays 56–59 to the lead 181 and the lead 192, which are connected with the minus terminal of the battery over the selector actuating relays 8 and 11 respectively. These circuits are also closed by the push button 84 directly over the working contacts of the relay 61. The push button 84 represents the complementary value corresponding to the push button 76. The push button 85 is shown to close a circuit over the relay 55. When this circuit is closed, the plus terminal could be switched to the lead 184 over the contact system pertaining to the relays 52–55. The same circuit over the lead 184 which is connected to the minus terminal of the battery over the coil on the selector actuating relay 32 is also closed by means of the push button 92. This is in agreement with the complementary value of the number 11, which is 89.

By means of the push buttons 94–102, which correspond to the multiplier values 1–9, the lead 208 is connected to the leads 213–216, which are connected to the minus terminal of the battery over the multiplication relays 41–44, Fig. 6. By means of the same set of push buttons 94–102, the lead 208 is also connected to the lead 217 which extends over the coil of the relay 49 to the minus pole of the battery. By means of the push buttons 85–93, the lead 208 is also closed with the lead 218, which is connected over a working contact of the relay 49 to the coil of the relay 51 through the lead 219. The push buttons 76–84 connect lead 208 to lead 220, which is connected over a working contact of the relay 49 to the lead 221 which is connected to the minus terminal of the battery over the coil on the relay 50. By working contacts of the relay 50, the leads 209–212 are connected to the leads 222–225. The leads 204–207 are connected over the working contacts of the relay 51 to the same leads 222–225. These leads are connected to the minus terminal of the battery over the coils of the relays 37–40, Fig. 6.

By means of the push buttons 94–102, circuits may be closed over the relays 41–44, and by means of the push buttons 76–93 it will also be possible to close circuits over the relays 37–40. According as one or more circuits are closed over the relays 37–44, the plus terminal of the battery may be closed over the sets of contacts pertaining to these relays and further to one or more of the leads 258–265. Thus the plus terminal may be connected with one or more of the leads 226–257, Fig. 6, over the contact system pertaining to the relays 37–40, which consists of 58 sets of contacts. Thus the plus terminal is connected with the following leads, if a circuit is closed over the coil of the relay 37:

243, 244, 248, 251, 252, 253, 254, 256, 257.

If a circuit is closed over the relay 38, the plus terminal of the battery will be connected with the following leads:

237, 238, 239, 240, 244, 247, 250, 251, 254, 256.

If circuits are closed over the relays 37 and 38, the plus terminal is closed with the following leads:

226, 232, 236, 239, 242, 245, 247, 249, 252, 253, 255.

The plus terminal of the battery is connected to the following leads when a circuit is closed over the relay 39:

226, 231, 232, 235, 237, 238, 241, 246, 248, 249, 255, 256.

For circuits closed over the relays 37 and 39 the plus terminal of the battery will be connected to the following leads:

226, 228, 231, 233, 235, 236, 249, 250, 251, 252.

For circuits closed over the coils 38 and 39 the plus terminal will be closed with the following leads:

228, 229, 231, 233, 235, 236, 238, 239, 243, 245, 248, 249, 253, 254, 257.

For circuits closed over the coil of the relays 37 and 38 and 39 the plus terminal of the battery will be connected to the leads:

228, 229, 233, 234, 235, 237, 239, 240, 246, 247, 252, 254, 255.

For a circuit over the coil of the relay 40 the plus terminal will be closed with the following leads:

228, 229, 230, 232, 233, 234, 238, 242, 247, 250, 251, 253, 255, 257.

For circuits closed over the coils of the relays 37 and 40 the plus terminal of the battery is connected to the following leads:

226, 227, 229, 230, 232, 233, 234, 236, 237, 241, 248, 250, 252, 256, 257.

The leads 226–257 may be connected to one or more contact groups distributed over four contact relays, the connection being then carried into effect as shown in Fig. 6, wherein the said set of contacts will be connected to one or more of the leads 258–265, according as circuits are closed over one or more of the coils of the relays 41–44.

If a circuit is closed over the relay 41, the leads 258, 259 and 260 will be connected to the leads 252, 239 and 235, respectively.

If a circuit is closed over the relay 42, the leads 259, 260, 261 and 262 will be connected to the leads 253, 247, 241 and 233, respectively.

If circuits are closed over the relays 41 and 42, the leads 258, 259, 260, 261, 262 and 263 will be connected to the leads 252, 256, 250, 245, 231 and 234 respectively.

If a circuit is closed over the relay 43, the leads 259, 260, 261, 262, 263 will be connected to the leads 232, 248, 240, 232 and 233 respectively.

For circuits over the relays 41 and 43, the leads 258, 259, 260, 261, 262, 263 and 264 will be connected to the leads 252, 239, 235, 230, 239, 235 and 230 respectively.

For circuits over the relays 42 and 43, the leads 259, 260, 261, 262, 263 and 264 will be connected to the leads 254, 248, 242, 236, 231 and 234 respectively.

For circuits over the relays 41, 42 and 43, the leads 258, 259, 260, 261, 262, 263, 264 will be connected to the leads 252, 257, 251, 245, 250, 226 and 229 respectively.

For current over the relay 44, the leads 259, 260, 261, 262, 263 and 264 will be connected to the leads 237, 247, 243, 237, 232 and 233 respectively.

For circuits closed over the coils of the relays 41 and 44, the leads 258, 259, 260, 261, 262, 263, 264 and 265 will be connected to the leads 252, 255, 249, 244, 238, 255, 228 and 227 respectively.

The leads 258–265 pass over working contacts of the relays 45, 46 and 47, Fig. 7. The leads 258–261 are further connected to the minus terminal of the battery over the said working contacts of relay 45 and over the coils of the relays 8–11.

The same leads 258–261 are connected over working contacts of the relay 46 to the leads 177, 178, 179 and 184 for the relays 29–32. The leads 262–265 are connected to the same leads 177, 178, 179 and 184 over working contacts of the relay 47. The coils of the relays 45 and 47 are connected to the lead 221 over a resting contact and a working contact of the relay 48 respectively. The coil of this relay 48 is connected to the lead 221 over a working contact of the relay 50. The lead 219 is connected to the minus terminal of the battery over the relay 51 as well as over the relay 46.

The relay 48 is in known manner made so as to be particularly slow-operating, so that the circuit of the relay 45 is not opened until the recording relays 8–11 have had time to respond. In carrying out a multiplication one of the multiplier buttons 94–102 is pressed down, whereby the lead 208 being connected to the plus terminal of the battery over the resting contact 20' of the relay 20, Fig. 4, is connected to lead 217, so that the relay 49 is excited and the working contacts of the latter are closed connecting lead 220 with 221 and lead 218 with 219. When now one of the buttons 85–93 is pressed down, the relays 46 and 51 are energized over lead 219. By the same push buttons the plus terminal is also closed with one or more of the leads 204–207 which over working contacts of the relay 51 close circuits over the coils 37–40. At the same time the leads 258–261 are closed over working contacts of the relay 46 onto the selector actuating relays 29–32. By one of the push buttons 76–84, the lead 208 is connected to the lead 220 so that, at first, the relays 50 and 45 are excited. The circuit for the relay 45 goes over a resting contact of the relay 48. Over working contacts of the relay 50, the leads 209–212 are closed with the leads 222–225 leading to the coils 37–40. At the same time the plus terminal is closed over the leads 258–261 and over working contacts of the relay 45 for the selector actuating coils 8–11. By a working contact of relay 50 the circuit is closed for the sluggishly operating relay 48, so that a little while later the contact spring of the relay 48 changes over from its resting contact to its working contact and thereby the relay 47 will be excited. Hereby the leads 262–265 are closed over working contacts of the relay 47 and over the coils 29–32. The unit values and the ten values will thus be multiplied and accumulated each per se.

The leads 130–135 and 163–168 are connected to the plus terminal over the sets of contacts of the selectors. By means of the push button 103 Fig. 7, a circuit is closed over the relay 63, whereby the said leads 131, 132, 134, 135 and 164, 165, 167, 168 are connected to leads 204–207 and 209–212, respectively. The leads 133 and 166 are closed over the coils 65 and 66. By these coils the plus terminal is closed over working contacts with the leads 210 and 211 and the leads 205 and 206. The said groups of leads, which may also be connected to the plus terminal by means of the push buttons, may be switched over to other groups of leads by means of the relays 61 or 62 as well as by the relay 49, as already described. For example, if the relay 62 is operated, the complementary values of what is recorded in the selectors will also be recorded by the latter, so that the result will be nought. This may be of interest for the purpose of control.

By means of the push button 104 a circuit is closed over the relay 64. The set of leads coming from the selectors will be switched over, by means of the working contacts of this relay 64, to the relays 268 and 269, Fig. 10. The leads 130–135 and 163–168 are connected over the contacts of the relay 64 to the leads 130'–134' and 270 and to the leads 163'–167' and 271, respectively. Over resting contacts of the relay 268, the said groups of leads 130–134 from the selectors will be connected to the leads 272–276, while the said set of leads will be connected over the working contacts of the same relay to the leads 277–281. These leads are in Fig. 10 connected to magnets 282–291. The leads from the other group of selectors are connected to the magnets 292–301 over the contacts on the relay 269. This connection is not shown in Fig. 10. Figs. 9 and 10 show a printing device wherein the said magnets adjust two printing bars 302 and 303 by means of the fixed stops 304 on the bars. By means of the latter the bars may be stopped in 10 different positions according to the position of the magnet, the armature arms 305 of which hold the bars when these are pressed forth by the helical springs 306. These springs are held under tension by the eccentric roller 307. This roller may be turned through an angle of 180 degrees by means of the handle 308. The bars will be moved forwards into the position shown in Fig. 9, provided they are not retained by the armature arm of a magnet. At the movement of the eccentric roller, the boss 309 strikes against the arm 310 of the hammer 311, in a manner such that the latter is struck down upon the types 312. The rollers 313 and 314 each have a strip of paper and of carbon paper 315 and 316 respectively wound thereon, said strips being pulled forth between the hammer and the types therebeneath, so that the number corresponding to the position of the bars will be printed on the paper strip.

The selectors shown in Figs. 4 and 5 are arbitrarily chosen to carry out five steps each, which suffices for several kinds of practical routine work. For other purposes it would be necessary to supply the selectors with more steps or to transmit the value represented by the fifth step to other selectors. Upon finishing the fifth step, the selectors will again be in their initial or zero position and the value of this fifth step, which for the selectors 67–70 are the values of 5, 10, 20 and 40, respectively, has to be transferred. In order to perform the transfer simultaneously in as many selectors as possible for time saving purposes, each selector may energize, as soon as one cycle of steps is accomplished, a special relay, such as the relays 12–15, Fig. 4, and 33–36, Fig. 5. Circuits are closed over these relays, over line 169 when the 170 contacts belonging to the fifth set of contacts of the selectors are closed, simultaneously as the respective selector-actuating magnets $h$ are energized and the corresponding $y$ contacts are closed. After the fifth impulse has been completed and the selectors have moved into their first or initial position, the last-mentioned relays will be kept energized by the holding circuits over resting contacts of relay 18 for the relays 12 and 33, and of relay 17 for the relays 13–15 and 34–36. The relays which in this way are energized will, therefore, indicate that the corresponding selector has completed one cycle and the transfer can arbitrarily take place simultaneously from all the relays. The transfer takes place as soon as the line 105' is connected to the plus terminal of the battery. This can be done by pressing the button 105. The line 105' will also be connected with the plus terminal of the battery automatically over the line 169 and the $x$ contacts of the selector-actuating magnets $h$ when the selector contacts 67a–74a belonging to the third set of contacts of the selectors and the corresponding transfer relays 12–15 and 33–36, are energized. Line 105' also closes a circuit over relay 20. The plus terminal over the battery is connected over a working contact of this relay with line 171'. Line 171 is directly connected with line 169 and also connected with the plus terminal over a resting contact of relay 60. The transfer circuits are closed over working contacts of the relays 16 and 19. Over working contacts of relay 19 the line 171 is connected over working contacts of relay 12 with the lines 181 and 180 for energization of the selector-actuating magnets 8 and 10, transferring the value "five" in the first denomination. The lines 182 and 183 from working contacts of relay 19 are connected with the lines 177 and 179 for energization of the selector-actuating magnets 29 and 31, transferring the value "five" in the second denomination. Over working contacts of relay 16 the line 171 is connected with lines 177, 178 and 179 over working contacts of relays 13, 14 and 15, respectively, closing circuits over the selector-actuating magnets 29, 30 and 31. The values from the first denominational order representing the values 10, 20 and 40 are thereby transferred to the next higher denominational order. The same values from the second denominational order could be transferred to a third denominational order by closing line 171 by the lines 185, 186, and 187 which over working contacts of the relays 34–36 are connected with the line 188, 189 and 190 connected with the first, second, and third selector actuating magnet $h$ for the next higher denominational order, if such one is to be added. The energization of the relays 16 and 19 takes place in the following manner. The line 105' is closed with the line 174 over resting contacts of relays 12 and 33 and lines 173 and 173'. If another group of selectors for the next higher denomination order should be added, line 173' has to be switched over to line 191 by the switch 75, Fig. 7, and then be connected with line 174 over a resting contact of the transfer relay corresponding to the value "five" in that group of selectors, and so on. Line 174 closes circuits over relay 16 by line 175, if any of the transfer relays 13–15 and 34–35 are energized. By relay 16 a circuit closes from line 171' over relay 17, whereby the holding circuit for the last-mentioned relay is interrupted. Thereby the relays will be de-energized and the selectors concerned advance one step. If any of the relays corresponding to the value "five", such as 12 and 33, is energized, the line 105' will be switched over to line 176 closing a circuit over relay 19, thereby closing the circuits for transferring the value "five", as described. Simultaneously, a circuit is closed by relay 19 over the line 171' energizing the relay 18, whereby the holding circuit for the transfer relays corresponding to the value "five", such as relays 12 and 33, is interrupted, and the relays will be deenergized as well as the transfer circuits described, whereby the selectors concerned advance one step.

*Numerical examples*

The mode of operation of the apparatus will be recapitulated with reference to a single combined calculating operation which may be performed within the scope of the capacity of the machine herein described.

$$4 \times 13 + 37 - 17 = 72$$

Multiplication is carried out by partial products. Thus the following operation 1 concerns the partial product $4 \times 10$ and operation 2 concerns the partial product $4 \times 3$. Thereafter the value 37 is added in operation 3, and in operation 4 the value 17 is subtracted. Operation 5 concerns the taking of the total of the example in question.

*Operation 1.*—The push button 97 representing the multiplier is depressed and latched down and thereafter or simultaneously the button 85 representing the multiplicand 10 is depressed, the following circuits being then closed: plus terminal over resting contact of the relay 20 and lead 208. Lead 208 is connected by the push buttons to leads 217 and 215 and leads 218 and 204. Lead 217 closes the circuit over the coil 49 closing 220–221 and 218–219, and lead 215 closes the circuit over the coil 43. Lead 219 closes the circuit over the coils 46 and 51 to the minus terminal of the battery. Lead 204 is closed over a working contact of the relay 51 to lead 222 which is connected over the coil 37 with the minus terminal of the battery. Over the contact system of the relays 37–40, Fig. 6, the following leads will be connected with the plus terminal of the battery: 243, 244, 248, 251, 252, 253, 254, 256, 257. Over the contact system of the relays 41–44, the leads 259, 260, 261, 262 and 263 will be connected to the leads 232, 248, 240, 232 and 233, but only the lead 248 of all of said leads extends completely through to the plus terminal through contacts of relays 37–40.

The various connections are as follows, considering the relays 37 and 43 being energized, while the others are at rest: From the left-hand working contact 601 of relay 37 over the horizontal lead 501, second resting contact 603 of relay 38, lead 504, resting contact 604 of relay 39, lead 505, resting contact 605 of relay 40, lead 506 to horizontal lead 254; lead 504, resting contact 606 of relay 39, lead 507, resting contact 607 of relay 40, lead 508 to horizontal lead 256; lead 504, resting contact 611 of relay 39, lead 509, resting contact 612 of relay 40, lead 510 to horizontal lead 244; lead 504, resting contact 613 of relay 39, lead 511, resting contact 614 of relay 40, lead 512 to horizontal line 251; lead 501, third resting contact 615 of relay 39, lead 513, resting contact 608 of relay 39, lead 514a, resting contact 609 of relay 40, lead 515 to horizontal lead 243b, resting contact 610 of relay 40, lead 516 to horizontal lead 257; lead 513, resting contact 616 of relay 39, lead 517, resting contact 617 of relay 40, lead 518 to horizontal line 248; lead 501, resting contact 618 of relay 39, lead 519, resting contact 619 of relay 40, lead 520 to horizontal lead 253; lead 501, vertical lead 503 to horizontal lead 252; from the right-hand working contact 602 of relay 37 over the horizontal lead 502 there is no connection to any of the horizontal leads 226–257. Line 259 at the bottom of Fig. 6 is connected over resting contact 620 of relay 41, lead 521, resting contact 621 of relay 42, lead 522, working contact 622 of relay 43, lead 523 to horizontal lead 232; line 258 has no connection; line 260 over resting contact 623 of relay 41, lead 524, resting contact 624 of relay 42, lead 525, working contact 625 of relay 43, lead 526 to horizontal lead 248; line 261 over resting contact 626 of relay 41, lead 527, resting contact 627 of relay 42, lead 528, working contact 628 of relay 43, lead 529 to horizontal lead 240; line 262 over resting contact 630 of relay 41, lead 530, resting contact 631 of relay 42, lead 531, working contact 632 of relay 43, lead 532 to horizontal lead 232; line 263 over resting contact 633 of relay 41, lead 533, resting contact 634 of relay 42, lead 534, working contact 635 of relay 43, lead 535 to horizontal lead 233; line 264 has no connection, as the working contact 636 of relay 42 and the working contact 637 of relay 44 are open; line 265 has no connection, as the working contact 638 of relay 41 is open.

Over a working contact of the relay 46, the lead 260 is connected to lead 179 which extends to the minus terminal of the battery over the coil of the selector actuating relay 31. This relay moves the roller 73 which is supposed to be in its initial position, a step onward in such a manner that the contact closures performed by this roller are moved from the 1st to the 2nd set of contacts when push button 85 is released. The value 40, which is the result of the multiplication 4×10, has thus been accumulated since one step of the roller 73 corresponds to the value 40.

Operation 2.—Push button 78 representing the multiplicand value 3 is depressed, the button 97 still being latched down, and lead 208 is hereby connected to leads 220 and 209 and 210. Lead 220, which is connected to lead 221 over a working contact of relay 49, over the coil of which the circuit is still closed by the button 97, is connected to the minus terminal of the battery over the coil 50 and over coils 45 and 48, over a working contact of the relay 50 and a resting contact of the relay 48. As stated, the relay 48 is retarded for a certain time before its armature responds. During this lapse of time leads 209 and 210 will be closed over working contacts of the relay 50 with leads 222 and 223 for the coils 37 and 38. The plus terminal is now closed over the contact system for the relays 37–43 with leads 259 and 262. Of these the lead 259 is connected to the lead 193 over the relay 45. Lead 193 passes over the recording coil 9. The contacts corresponding to the roller 68 will thus be closed as far as the second set of contacts are concerned. Hereby the numerical value 2 has been accumulated, inasmuch as each step of the roller 68 represents the number 2. Immediately after this relay has responded, the circuit is opened by the lead 221 being connected to the coil 47 over a working contact of the relay 48 instead of being connected to the coil 45. Over working contacts of the relay 47, the lead 262 is connected to the lead 177 over the coil of the selector-actuating relay 29. Now, if the push buttons 97 and 78 are released the circuit over the selector-actuating relay 29 is opened, and the contacts pertaining to the roller 71 will be closed as far as the 2nd set of contacts are concerned. Hereby the numerical value 10 has been accumulated and this, with the accumulated value 2, comprises the value 12 which is the result of the multiplication 4×3 in this second operation. All push buttons are now in released positions.

Operation 3.—Push button 107 which effects the carrying out of an addition, push button 87 representing the value 30 to be added, and push button 82 representing the value 7 to be added are depressed either simultaneously or one after the other. By push button 107 a circuit will be closed over the coil of the relay 61. Over working contacts of this relay, the leads 204 and 205 and 209, 210 and 211 will be closed, and these are connected to the leads 177, 178 and 181, 193 and 180 by the relay 61. Hereby, circuits are closed over the selector-actuating relays 29, 30 and 8, 9, and 10. If the depressed push buttons are released, the rollers 71 and 72 and the rollers 67, 68 and 69 are each moved onward one step. Of the sets of contacts pertaining to the rollers the 2nd contact set will now be closed by the roller 67. Roller 68 closes the 3rd set of contacts. Roller 69 closes the 2nd set of contacts, roller 71 closes the 3rd set of contacts, roller 72 closes the 2nd set of contacts, and roller 73 closes the 2nd set of contacts. The push buttons 107, 87 and 82 are again in released position.

Operation 4.—Push button 106 which effects the carrying out of a subtraction operation, push button 85 representing the value 10 to be subtracted and push button 82 representing the value 7 to be subtracted are depressed. A circuit is closed over the relay 62 by button 106. Over working contacts of this relay, the lead 204 is closed over the coil of the relay 55, and the leads 209, 210 and 211 are closed over the coils 59, 58 and 57 onto the minus terminal of the battery. All leads are connected with the plus terminal of the battery over the lead 208. Over the contact system for the relays 52–55, the plus terminal is closed over the lead 184 for the selector actuating relay 32. Over the contact system for the relays 56–59, the plus terminal is closed with the leads 181 and 193 over the coils for the selector actuating relays 8 and 9. Now, if the push buttons are released, the rollers 67, 68 and 74 are moved by one step. The sets of contacts pertaining to the respective rollers are now closed as follows: For roller 67 the 3rd contact set, for roller 68 the 4th contact set, for roller 69 the 2nd contact set, for roller 70 the 1st contact set, for roller 71 the 3rd contact set, for roller 72 the 2nd contact set, for rollers 73 and 74 the 2nd contact set also. The push buttons 106, 85 and 82 are now in released position.

Operation 5.—Now, if for instance push button 104 is depressed, a circuit will be closed over the relay 64. Hereby the following circuits are closed over the contacts of the selectors: plus terminal, 3rd set of contacts of the roller 67, lead 110 connected to the 2nd contact bar of the selector 68, 4th contact set, lead 116 connected to the 5th contact bar of the selector 69, 2nd contact set, which is connected by the lead 123 over a coil on relay 2 to lead 118, which is closed over the 2nd contact bar and the 1st set of contacts of the selector 70 to lead 131, which is connected over working contacts of the relay 64 over a resting contact of the relay 268 to lead 273, which is connected to the minus terminal of the battery over the printing magnet 284.

Over the contact system on the relays 1-7, the plus terminal is connected to lead 137, which is connected to the 2nd contact bar for the selector 71. Over the 3rd contact set of this selector, the 2nd contact bar is connected to the minus terminal of the battery over one of the coils of the relay 21. Moreover, the lead 144 from the same set of contacts is connected to the lead 151 over the 2nd bar and 2nd set of the selector 72 and is connected further to the lead 162 over the 3rd bar and 2nd set of selector 73 connected to the lead 166 over the 5th bar and 2nd set of selector 74 and over a coil of relay 28. By closing working contact of relay 21 lead 168 (271) passes over the coil of relay 269, Fig. 10. Lead 166 (166') passes over a working contact of the same relay 269 over the coil of the printing magnet 299. The leads from the resting and working contacts of the relay 269, which are not shown connected in Fig. 10, extend however to the magnets 292-301, in the manner shown with reference to the resting and working contacts of the relay 268, which are connected to the magnets 282-291. The 1st set of magnets 282-291 correspond to the units of the decimal system, while the 2nd set of magnets 292-301 correspond to the tens of the decimal system. The two magnets, over the coils of which circuits were closed, that is to say 284 and 299, will retain the bars 302 and 303 after a movement of two and seven digits respectively. Now, if as a 6th operation the eccentric roller 307 is turned clockwise, the bar 303 will be brought by its spring into printing position for the digit 7 and the bar 302 into printing position for the digit 2. Consequently, the hammer 311 will print the number 72 on the paper strip as a result of the calculating operations performed.

If instead of the push button 104 the push button 103 had been operated, whereby the plus terminal would be closed over the coil of the relay 63, the lead 131 would be connected to the lead 210, whereas the lead 166 would be connected to the minus terminal of the battery over the relay 66. Lead 168 is connected to the lead 204, while the plus terminal is connected over working contacts of the relay 66 to the leads 205 and 206. Since these leads correspond to the numerical values 2, 10, 20 and 40, and 2 is the code value in the units order, while 10, 20 and 40 are the code values in the tens order, all four values together represent the result 72 which thus is expressed in the code 1—2—4—8.

The lines energized by relay 63 may be extended to additional registers, recording devices or card punching mechanism but, for simplicity of illustration and explanation, have been shown only as returned to the code value lines that are controlled by the numerical value push buttons 76-84 and 85-93, thus providing a check upon the accuracy of the operation of the mechanism.

The operation of key 104 at the close of a computation serves to print out the result by the mechanism shown in Figs. 9 and 10. If keys 103 and 106 are depressed simultaneously with the printing key 104, the result lines of relay 63 return the registered value to the machine but, due to the actuation of relay 62 by key 106, the complement of the registered value is set up in the accumulators. This complement, when added to the registered value, should be zero and the operation may therefore be checked by again depressing the key 104 to print out the value registered in the accumulators. If the second printed value is not zero, the operator is advised that there has been some error in the operation of the mechanism.

In the example above discussed, the result determined by the mutual positions of the step selectors was expressed by the 10-digit or decimal system. It could also, however, be simply expressed according to any other code system.

Fig. 11 shows a circuit diagram of the contacts of the step selectors, by means of which the result will be expressed, for instance, according to the duodecimal system. Fig. 12 shows a circuit diagram, by means of which the mutual position of the step selectors is expressed according to the numerical system having "20" as its basis.

The frames 317-320, Fig. 11, are diagrammatic representations of the rollers i of the step selectors shown in Fig. 2, and the rectangles 321-324 designate the magnets h in Fig. 2 for advancing the rollers step by step. Since the mechanical transmission means are disclosed in Fig. 2, all mechanical contrivances have been omitted in Fig. 11 for the purpose of rendering the diagram clearer. The connections of the contacts of the step selectors which, by the way, are analogous to the connections discussed with reference to Figs. 4 and 5, will immediately appear from the drawings. The leads 325'—330' from the 1st set of contacts of the selector 319 are connected to the six bars v of the selector 320. Leads 325''—329'' are connected in numerical order to the same leads over coils of the relay 326. From the contacts of the 1st set of contacts of the selector 320, the leads 327-332 are extended out as result leads. The leads 333-338 are connected in numerical order to the same leads over coils of the relay 339. The leads 340—345 are also connected to the same result leads in numerical order over coils of the relay 346. The leads 347-350 are connected to the lead 351 over the contact system for the relays 326, 339 and 346. The lead 351 is connected directly to the plus terminal of the battery by means of a push button 352.

The push buttons 353-363 correspond to the numbers 1-11 and close circuits over one or more of the selector actuating relays 321—324. Thus the circuit is closed over the relay 321 by the push button 353. By the push button 354 the circuit is closed over the relay 322. Push button 355 closes circuits over relays 321 and 322. Push button 356 closes the circuit over relay 323. Push button 357 closes circuits over relays 321 and 323. Push button 358 closes the circuit over relays 322 and 323. Push button 359 closes the circuit over relays 321, 322 and 323. Push button 360 closes the circuit over relay 324. Push button 361 closes the circuit over relays 321 and 324. Push button 362 closes the circuit over relays 322 and 324. Push button 363 closes the circuit over relays 321, 322 and 324. By means of these push buttons, the selectors 317-320 may be adjusted in different positions relatively to each other.

The step selectors in Fig. 11 have four sets of contacts each. The capacity is selected arbitrarily so far and, moreover, no means are shown whereby the rollers may be brought into the initial position, nor any means whereby the capacity can be increased beyond the number of contact sets at automatic transmissions to higher basic values, such as described with reference to the selectors 67–70 in Fig. 4 and 71–74 in Fig. 5, to which description reference is made here. On depression of the push button 352 the plus terminal is connected to lead 351 which is connected to the contact bar of the selector 317 as well as to the movable spring of the relay 326. The plus terminal of the battery will thus be connected both to one of the leads 327–332 over the contacts of the step selectors and to one of the leads 347–350 over the contact system for the relays 326, 339 and 346. These result leads may be connected to a printing device such as was described with reference to Fig. 10. In Fig. 11, the result will appear as a table with the aid of signal lamps. Thus the leads 327–332 are extended onto the minus terminal of the battery over the lamps 364, 366, 368, 370, 372 and 374 over resting contacts of the relay 376. The circuit of the relay 376 is closed from the plus terminal of the battery over the push button 352 and a contact of the 2nd or 4th sets of contacts on the selector 317 in the lead 377 and onto the minus terminal of the battery over the coil of the relay 376. If this circuit is closed, the leads 327–332 are closed over working contacts of this relay to the minus pole of the battery over the signal lamps 365, 367, 369, 371, 373 and 375. The leads 347–350 extend over the contact switches 378–381 onto the lamps 382–385. By means of the contact switches the leads 347–350 may be switched over to the leads 386–389. These leads are extended out of Fig. 11 and will reappear in Fig. 12 where they are seen as being connected to each one of the four contact bars of the step selector 390.

Fig. 12 discloses the step selectors 390–393. The selector actuating relays 394–397 move the rollers of the step selectors in the manner described with reference to Fig. 2. Circuits are closed over the coils of the relays by means of the push buttons 398–407. The contacts of these push buttons are connected in a manner analogous to that described with reference to the push buttons 353–362. The leads 408–417 from the contacts of the 1st set of contacts and the 6th and 7th contacts of the 2nd set of contacts, as well as the 6th contact of the 3rd set of contacts of the selector 392 are connected to the respective bars of the selector 393. The 5th, 6th and 7th contacts of the 4th set of contacts as well as the 7th contact of the 3rd set of contacts, which are connected to the 5th contact of the previously mentioned set of contacts, are connected to the leads 408, 409 and 410 over coils of the relay 444. From the 1st to the 5th contact of the 1st set of contacts of the selector 393, the leads 418–422 are extended out as result leads. The leads from 6th to the 10th contact of the same set of contacts are extended onto the same result leads over coils of the relay 423. The 7th, 8th, 9th and 10th contacts of the 2nd set of contacts as well as the 7th contact of the 3rd set of contacts are also connected to the same leads over coils of the relay 424. The 4th to 8th contacts of the 4th set of contacts of the selector 393 extend to the same leads over coils of the relay 425, while leads from the 9th and 10th contacts of the 4th set of contacts are connected to the leads 418 and 419 over coils of the relay 426. The leads 418–422 are connected to the minus terminal of the battery over resting contacts of the relay 427 through the signal lamps 428, 430, 432, 434 and 436. In the selector 390, a lead from the 2nd and 4th contacts of the 1st set of contacts and the 4th contact of the 3rd set of contacts are extended over coils of the relay 438, before they are connected to the respective contact bars of the selector 391. On depression of the push button 439, the plus terminal of the battery is connected to the 1st bar of the selector 390. Hereby the plus terminal of the battery will be connected to one of the leads 418–422. Provided the circuit is closed over one of the coils of the relay 438, the plus terminal of the battery will be connected by means of the working contact of this relay to the lead 440 which is connected to the minus terminal of the battery over the coil of the relay 427. The circuits over 418–422 will then be closed over working contacts of the said relay onto the minus terminal of the battery through the signal lamps 429, 431, 433, 435 and 437. At the same time, the plus terminal of the battery will be connected over the contact system for the relays 444, 423, 424, 425 and 426 to the minus terminal of the battery through the signal lamps 441, 442 and 443.

*Numerical examples*

In connection with Fig. 11, the calculating operation 3+9+11, for example, will be examined. The push buttons 355, 361 and 363 corresponding to the said numbers will be depressed in numerical order. The rollers, which are all assumed to be in the initial position, will be fed by steps through these operations, in a manner such that their mutual positions will be the following after the impulses given from the push buttons to the selector actuating relays. Selector 317 is advanced 3 steps, so that the 4th set of contacts is closed. Selector 318 is advanced 2 steps, so that the 3rd set of contacts is closed, and this also holds true with respect to selector 320. By means of the push button 352, the following circuits are closed: plus terminal onto lead 351 which is connected to the contact bar of the selector 317, which is connected over the 4th set of contacts to the 2nd contact bar of the selector 318, which is connected over the 3rd set of contacts to the 4th bar of the selector 319, which is connected over the 1st set of contacts to the lead 328'. This lead is connected to the 4th contact bar of the selector 320, which is connected to the lead 338 connected to the lead 332 over a coil of the relay 339. The bar of the selector 317 is in the 4th set of contacts also connected to the lead 377 which is closed onto the minus terminal of the battery over the coil of the relay 376. The lead 332 is connected over a working contact of the relay 376 onto the minus terminal of the battery through the signal lamp 375. By means of the push button 352, the plus terminal was connected to the lead 351, which is connected to the lead 348 over a resting contact of the relay 326, a working contact of the relay 339 and a resting contact of the relay 346. The lead 348 is connected over a resting contact of the switch 379 onto the minus terminal of the battery through the signal lamp 383. The signal lamp 375 indicates the number 11, and the signal lamp 383 indicates number 1 pertaining to the next higher order of the duodecimal system.

The same numerical example will be examined in connection with the step selectors of Fig. 12. The numbers 3, 9 and 11 are set up by means of the push buttons 400, 406 together with 407 and 398, whereby the selectors 390, 391 and 393 respectively keep the 4th, 3rd and 3rd sets of contacts closed. The selector 392 is in the initial position. On depression of the key 439 the plus terminal is closed over the 1st contact bar of the selector 390 which in the 4th set of contacts is connected to the 2nd bar of the selector 391 over a coil of the relay 438. The 3rd set of contacts connects this bar to the 4th bar of the selector 392 which is connected to the lead 411. The lead 411 is connected to the fourth contact bar of the selector 393, and a contact of the 3rd set of contacts of this selector is connected to the lead 419 over a coil of the relay 424. Since at the same time a circuit is closed from the plus terminal over a working contact of the relay 438 over the lead 440 to the minus terminal of the battery over the coil of the relay 427, the lead 419 will be closed to the minus terminal of the battery over a working contact of the relay 427 through the signal lamp 431. This lamp indicates 3 within the 1st order of the system having "20" as its basis. At the same time, the plus terminal of the battery is closed over a resting contact of the relay 444 and a working contact of the relay 424 onto the minus terminal of the battery through the signal lamp 442, which represents number 1 pertaining to the next higher order of the said numerical system.

If with the aid of the switches 378–381, Fig. 11, the leads 347–350 are connected to the leads 386–389, the circuit which in the numerical example described in connection with Fig. 11 was closed over the signal lamp 383 will be connected to the lead 387, which in Fig. 12 is connected to the second contact bar of the selector 390. The 4th set of contacts of this bar is connected to the 3rd bar of the selector 391, and the 3rd set of contacts is connected here to the 5th bar of the selector 392, which in the 1st set of contacts is connected to the lead 412. This lead is connected to the 5th bar of the selector 393, which in the 3rd set of contacts is connected to the lead 420 over the coil of the relay 424. This lead 420 is connected over a resting contact of the relay 427 to the minus terminal of the battery over the signal lamp 432. The circuit over the lamp 442 will be closed henceforth.

From the numerical example in connection with Fig. 11 it will be seen that the number 23 is expressed as 1, 11; i. e., 11 units in the first denominational order and 1 unit in the second order in a numeral system having 12 as a fundamental element. The same numerical example in connection with Fig. 12 is expressed as 1, 3; i. e., 3 units in the first order and 1 unit in the second order in a numerical system having 20 as the fundamental element. If the leads 347–350 are connected to the leads 386–389, the values pertaining to the next higher order according to the duodecimal system will be transferred to the selectors in Fig. 12, where this transferred value will be treated as a unit of the system with the basis "20". The number 23 is recorded on both registers shown in Figs. 11 and 12. If this be conceived as 23 pence and 23 shillings, the result will appear immediately upon depression of the push button 352 as circuits closed over the signal lamps 375, 432 and 442. In this case, these lamps thus indicate 1 pound, 4 shillings and 11 pence.

What I claim is:

1. An electric calculating machine comprising for each denominational order a plurality of accumulating means less in number than the number of digits in a decimal notation, each accumulating means including a member adjustable in steps and a plurality of sets of switches selectively actuated by the adjustable member in accordance with the adjustment thereof, electrically actuated means for stepping said members in accordance with numerical values to be introduced into said accumulating means, result indicating means to indicate the result of a calculation, and an electrical network including leads interconnecting the switches of the several sets of said accumulator means for energizing said result indicating means.

2. An electrical calculating machine comprising a result indicator, a plurality of electrical circuits for selectively energizing said result indicator to display the numerical value representing the result of a calculation, means comprising switches for introducing the numerical values entering into a calculation, and means controlled by said switches for determining those of said plurality of electrical circuits that are to be completed to a current source; said switch controlled means comprising an electrical network having for each denominational order a plurality of accumulating means, each accumulating means including a member adjustable step-by-step and a plurality of sets of switches selectively controlled by said member in accordance with the adjustment thereof, leads interconnecting the switches of said sets, and means energized by the switches of said value-entering means for adjusting said members in accordance with the numerical values entering into the calculation.

3. An electrical calculating machine as claimed in claim 2, wherein said electrical network includes manually operable switches and relay-actuated switches controlled thereby for determining the closing of circuits in said network in accordance with the nature of the calculation to be performed.

4. In an electrical calculating machine, the combination with a plurality of accumulating means corresponding to the values 1, 2, 4 and 8 for each denominational order, each accumulating means including a member adjustable step-by-step in accordance with increments of the value represented by that accumulating means and a plurality of sets of switches selectively controlled by the member in accordance with the adjustment thereof, of electrical means for adjusting the accumulating means in accordance with numerical values entering into a calculation, result indicating means, and an electrical network including leads extending between switches of the several switch sets for energizing said result indicating means.

5. The invention as claimed in claim 4, wherein said electrical network includes a plurality of circuits adapted to be energized selectively to control said result indicating means, a plurality of relays and switches actuated thereby for determining the circuits to be selectively energized to control the result indicating means, and circuits controlled by the sets of switches of said accumulating means for energizing said relays.

6. The invention as claimed in claim 4, wherein said members of the accumulating means are adjustable to five different positions.

7. In an electrical calculating machine, the combination with a plurality of accumulating means corresponding to the basic values of a code system, each accumulating means including a member adjustable step-by-step in accordance with unit increments of the basic code value represented by that accumulating means and a plurality of sets of contact means selectively controlled by the member, the number of adjustment steps for each member being equal to the number of sets of contact means; of electrical connections between contact means of one member and those contact means of the member of next higher order in the code system which represent the same absolute value, result indicating means, an electric network including leads extending between said contact means and said result indicating means, and electrical means for stepwise adjusting the said members selectively in accordance with numerical values entering into a calculation.

8. In an electrical calculating machine, the combination with a plurality of accumulating means for each denominational order corresponding to the basic values of a code system, each accumulating means including a member adjustable step-by-step in unit increments of the basic code value represented by that accumulating means and a plurality of sets of switches selectively controlled by the member; of electrical means for adjusting the members individually, electrical circuits including said electrical means and including key means for closing said circuits, result indicating means, and an electrical network including leads extending between said switches and said result indicating means.

9. The invention as claimed in claim 8, wherein the adjustable members of said accumulating means are rotatable members having a plurality of step-by-step adjustment positions for one complete rotation, the number of sets of switches for each rotatable member is equal to the number of step adjustments of that member which complete one rotation thereof, and each member selectively actuates one set of switches in accordance with the particular position to which that member is adjusted.

10. The invention as claimed in claim 8, wherein the sets of switches actuated by the adjustable members and the leads connected to the closed switches of the actuated sets establish circuits for actuating the result indicating means according to the predetermined results.

11. The invention as claimed in claim 8, wherein said result indicating means includes electrically operated means for transposing the result expressed in terms of the code system into terms of the decimal system.

ROLF HOFGAARD.